US011366037B2

United States Patent
Doki et al.

(10) Patent No.: US 11,366,037 B2
(45) Date of Patent: Jun. 21, 2022

(54) TIRE INSPECTION DEVICE WITH GAS SENSOR LEAK DETECTION AND TIRE INSPECTION METHOD WITH GAS SENSOR LEAK DETECTION

(71) Applicant: YAMAHA FINE TECHNOLOGIES CO., LTD., Hamamatsu (JP)

(72) Inventors: Yuichi Doki, Hamamatsu (JP); Takeshi Kato, Shimada (JP); Akane Iizuka, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 149 days.

(21) Appl. No.: 16/750,609

(22) Filed: Jan. 23, 2020

(65) Prior Publication Data
US 2020/0158591 A1 May 21, 2020

Related U.S. Application Data

(63) Continuation of application No. PCT/JP2018/026183, filed on Jul. 11, 2018.

(30) Foreign Application Priority Data

Jul. 28, 2017 (JP) .............................. JP2017-147129
Jul. 28, 2017 (JP) .............................. JP2017-147131
Jul. 28, 2017 (JP) .............................. JP2017-147132

(51) Int. Cl.
*G01M 3/16* (2006.01)
*G01M 3/20* (2006.01)
(Continued)

(52) U.S. Cl.
CPC ................ *G01M 3/16* (2013.01); *G01M 3/20* (2013.01); *G01M 17/0074* (2013.01); *G01M 17/022* (2013.01)

(58) Field of Classification Search
CPC ............................... G01M 3/16; G01M 17/02
See application file for complete search history.

(56) References Cited

U.S. PATENT DOCUMENTS 3,877,496 A     4/1975 Sperberg
4,491,013 A *   1/1985 Bubik ...................... G01M 3/24
                                                            73/146

(Continued)

FOREIGN PATENT DOCUMENTS

CN          1784594 A       6/2006
CN         201488882 U      5/2010
(Continued)

OTHER PUBLICATIONS

International Search Report issued in Intl. Appln. No. PCT/JP2018/027909 dated Sep. 11, 2018. English translation provided.
Written Opinion issued in Intl. Appln. No. PCT/JP2018/027909 dated Sep. 11, 2018.
International Search Report issued in Intl. Appln. No. PCT/JP2018/026183 dated Sep. 18, 2018. English translation provided.
(Continued)

*Primary Examiner* — Eric S. McCall
*Assistant Examiner* — Timothy P Graves
(74) *Attorney, Agent, or Firm* — Rossi, Kimms & McDowell LLP

(57) ABSTRACT

A tire inspection device includes a gas sensor disposed outside of a tire and facing an outer surface of the tire. The gas sensor detects a gas that fills the tire.

13 Claims, 12 Drawing Sheets

(51) Int. Cl.
  *G01M 17/007* (2006.01)
  *G01M 17/02* (2006.01)

(56) References Cited

U.S. PATENT DOCUMENTS

| | | |
|---|---|---|
| 5,798,696 A | 8/1998 | Wong |
| 6,330,821 B1 | 12/2001 | Arnold |
| 2009/0100909 A1 | 4/2009 | Grosse Bley |
| 2012/0261569 A1 | 10/2012 | Grosse Bley |
| 2013/0008578 A1 | 1/2013 | Taylor |

FOREIGN PATENT DOCUMENTS

| | | | | |
|---|---|---|---|---|
| FR | 2760271 A1 * | 9/1998 | ............ | G01M 3/103 |
| JP | S5334070 B2 | 9/1978 | | |
| JP | S53138108 A | 12/1978 | | |
| JP | H06156008 A | 6/1994 | | |
| JP | H0656744 U | 8/1994 | | |
| JP | H06347362 A | 12/1994 | | |
| JP | H0989708 A | 4/1997 | | |
| JP | 2001255229 A | 9/2001 | | |
| JP | 2002046583 A | 2/2002 | | |
| JP | 2002139397 A | 5/2002 | | |
| JP | 2003291606 A | 10/2003 | | |
| JP | 2003331353 A | 11/2003 | | |
| JP | 2005055263 A | 3/2005 | | |
| JP | 2005335459 A | 12/2005 | | |
| JP | 2007055559 A | 3/2007 | | |
| JP | 2008026052 A | 2/2008 | | |
| JP | 2008513799 A | 5/2008 | | |
| JP | 2009056908 A | 3/2009 | | |
| JP | 2012047651 A | 3/2012 | | |
| JP | 2012106573 A | 6/2012 | | |
| JP | 2013515252 A | 5/2013 | | |
| JP | 2015040836 A | 3/2015 | | |
| JP | 2016049818 A | 4/2016 | | |

OTHER PUBLICATIONS

Written Opinion issued in Intl. Appln. No. PCT/JP2018/026183 dated Sep. 18, 2018.
Office Action issued in Japanese Appln. No. 2018-096751 dated Jul. 3, 2018. English machine translation provided.
Yamaha Fine Technologies Co., Ltd. "Helium Leak Tester." Retrieved on Jul. 24, 2017. English translation provided.
Copending U.S. Appl. No. 16/750,518, filed Jan. 23, 2020 (a copy is not included because the cited application is not yet available to the public and the Examiner has ready access to the cited application).
Office Action issued in Chinese Appln. No. 201880047812.8 dated Feb. 2, 2021. English translation provided.
Office Action issued in Chinese Appln. No. 201880049571.0 dated Mar. 3, 2021. English machine translation provided.
Office Action issued in Japanese Appln. No. 2017-147129 dated Jun. 29, 2021. English machine translation provided.
Office Action issued in Japanese Appln. No. 2017-147131 dated Jun. 29, 2021. English machine translation provided.
Office Action issued in Japanese Appln. No. 2017-147132 dated Jun. 29, 2021. English machine translation provided.
Office Action issued in Chinese Appln. No. 201880047812.8 dated Jul. 6, 2021. English machine translation provided.
Office Action issued in Korean Appln. No. 10-2020-7001269 dated Jul. 8, 2021. English machine translation provided.
Extended European Search Report issued in European Appln. No. 18839176.7 dated Mar. 19, 2021.
Office Action issued in Chinese Appln. No. 201880049571.0 dated Nov. 19, 2021. English machine translation provided.
Office Action issued in Japanese Appln. No. 2018-085786 dated Oct. 5, 2021. English machine translation provided.
Office Action issued in U.S. Appl. No. 16/750,518 dated Oct. 4, 2021.
Office Action issued in Chinese Appln. No. 201880047812.8 dated Dec. 3, 2021. English machine translation provided.

* cited by examiner

TIRE INSPECTION DEVICE WITH GAS SENSOR LEAK DETECTION AND TIRE INSPECTION METHOD WITH GAS SENSOR LEAK DETECTION

CROSS-REFERENCE TO RELATED APPLICATIONS

The present application is a continuation application of International Application No. PCT/JP2018/026183, filed Jul. 11, 2018, which claims priority to Japanese Patent Application No. 2017-147129, filed Jul. 28, 2017, Japanese Patent Application No. 2017-147131, filed Jul. 28, 2017, and Japanese Patent Application No. 2017-147132, filed Jul. 28, 2017. The contents of these applications are incorporated herein by reference.

BACKGROUND OF THE INVENTION

Field of the Invention

The present invention relates to a tire inspection device and a tire inspection method.

Description of Related Art

Japanese Unexamined Patent Application, First Publication No. 2016-049818 (hereinafter referred to as Patent Document 1) discloses a method of immersing part of a tire in a vessel filled with a liquid in order to inspect a tire installed on a motorcycle for an air leak (gas leak).

SUMMARY OF THE INVENTION

The technique disclosed in Patent Document 1 requires the presence of a gas leak in a tire to be visually confirmed. However, because the defects in a tire (such as holes) that cause gas leaks are often fine, it is difficult to visually confirm the gas leak in the tire.

Further, because the method disclosed in Patent Document 1 requires a step that dries the liquid adhering to the tire after inspection (drying step), it is troublesome to perform the gas leak inspection of the tire. Moreover, there is also a problem that the time required to perform the gas leak inspection of the tire becomes long due to inclusion of the drying step.

Gas leak inspection methods according to the related art include a method (chamber method) in which the inside of a sealed container is placed in a vacuum state, and then a gas sensor detects a gas that has leaked out from a hollow object (workpiece) disposed inside the sealed container. Another gas leak inspection method according to the related art is a method (sniffer method) in which a gas that has leaked out from a workpiece is detected by manually bringing a probe, which includes a single gas sensor, close to the outer surface of the workpiece.

However, the rubber material which accounts for the main part of the tire has properties which include elasticity and gas permeability, easy deformation, and is capable of permeating a very small amount of gas, even under normal circumstances. For this reason, methods that inspect a tire that use the inspection methods according to the related art (the chamber method and the sniffer method) have not been considered.

The present invention has been made in view of the circumstances described above. An object of the present invention is to provide a tire inspection device and a tire inspection method that enable a gas leak in a tire to be inspected easily and with certainty in a short time.

A tire inspection device according to an aspect of the present invention includes: a gas sensor disposed outside of a tire and facing an outer surface of the tire. The gas sensor detects a gas that fills the tire.

A tire inspection system according to an aspect of the present invention includes: the tire inspection device described above; and an additional tire inspection device that covers a partial area of an outer surface of the tire, and inspects the partial area for presence of a gas leak.

A tire inspection method according to an aspect of the present invention is a tire inspection method using the tire inspection system described above, and includes: inspecting the tire for a gas leak using the tire inspection device; and inspecting the partial area for presence of a gas leak using the additional tire inspection device after the tire is inspected for a gas leak.

A tire inspection method according to an aspect of the present invention includes: closing an opening of a tire; filling the tire with a gas; and detecting the gas that fills the tire, in an atmosphere outside the tire.

A gas leak inspection device according to an aspect of the present invention includes: a gas sensor disposed close to an outer surface of a hollow inspection target, the gas sensor detecting a gas that fills the inspection target, on an outside of the inspection target; and a movement unit that relatively moves the inspection target and the gas sensor while causing the gas sensor to face an outer surface of the inspection target.

A gas leak inspection device according to an aspect of the present invention includes: a housing unit that houses a hollow inspection target; a gas sensor provided in the housing unit, the gas sensor detecting a gas which has leaked out from inside the inspection target housed in the housing unit; and a stirring unit that stirs air inside the housing unit.

EMBODIMENTS FOR CARRYING OUT THE INVENTION

First Embodiment

Hereunder, a first embodiment of the present invention will be described with reference to FIGS. 1 to 7, 11, 13A, and 13B.

Figure 1:
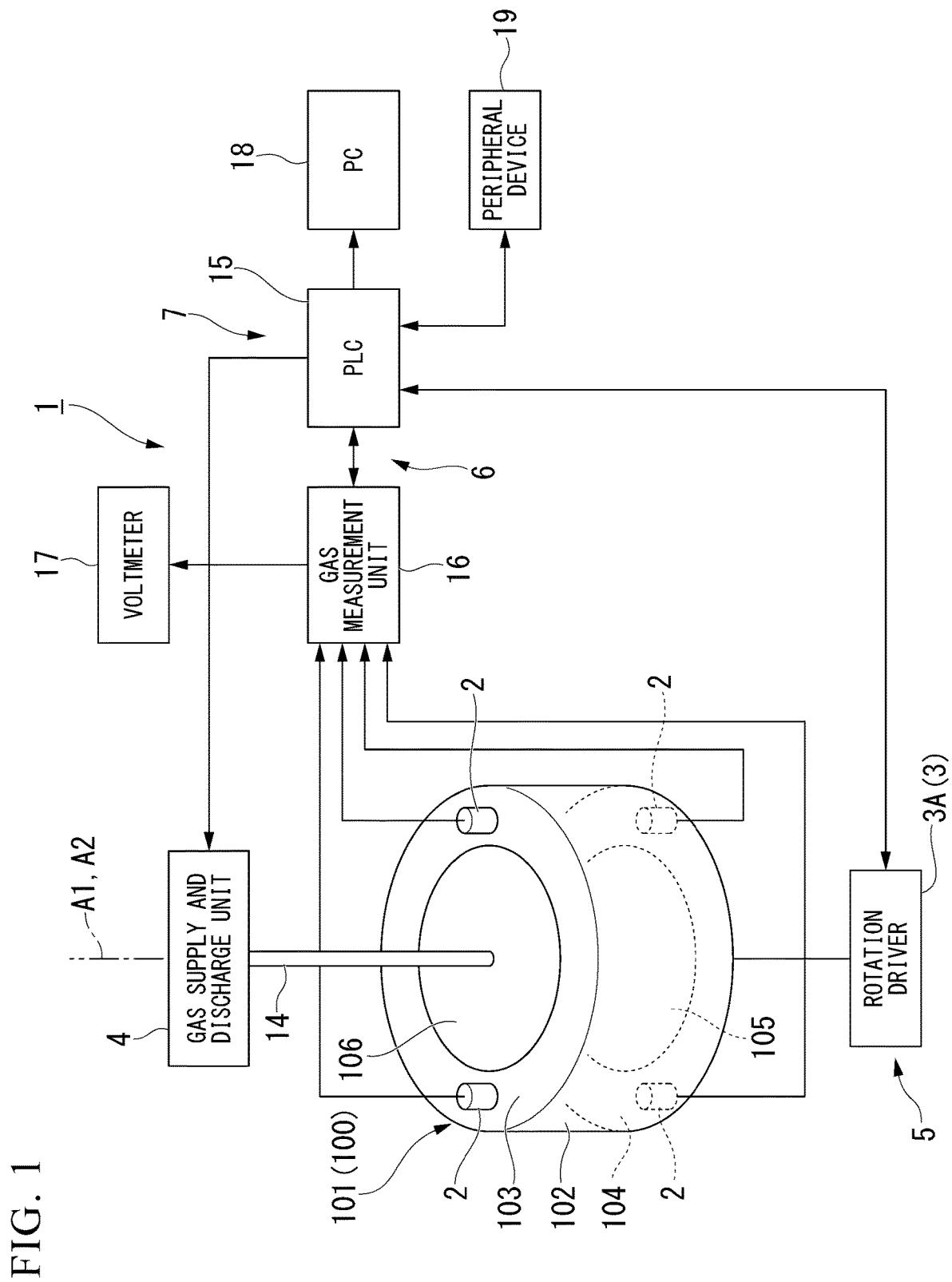
FIG. 1 is a diagram showing a configuration of a tire inspection device according to a first embodiment of the present invention.
Figure 2:
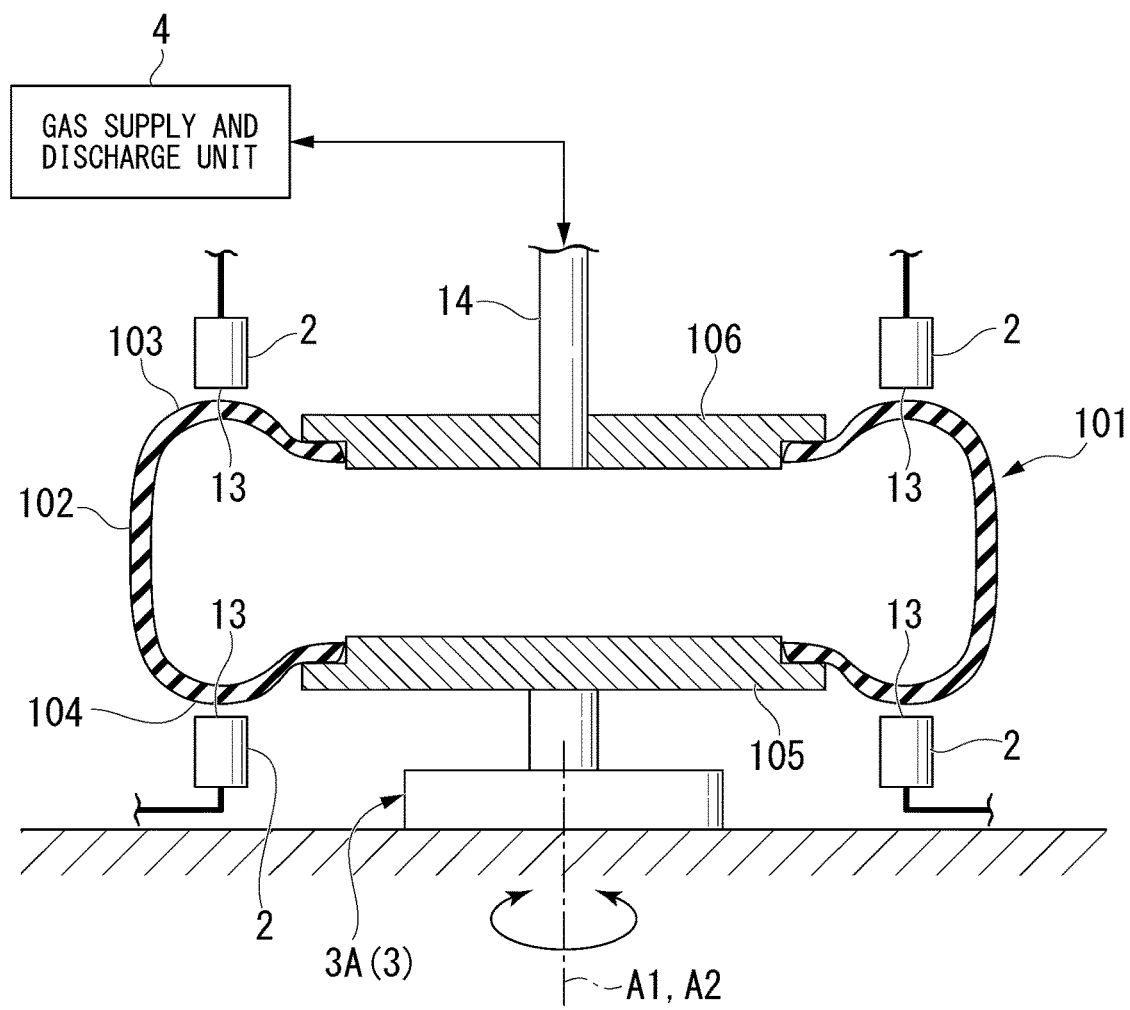
FIG. 2 is a cross-sectional view showing an arrangement example of gas sensors and a configuration example of a movement unit in the tire inspection device shown in FIG. 1.

In the present embodiment, the hollow inspection target that serves as the gas leak inspection target may be arbitrary. As shown in FIGS. 1 and 2, an inspection target 100 in the present embodiment is an axisymmetric object having an axisymmetric outer surface. Specifically, the inspection target 100 in the present embodiment is a tire 101 used in a vehicle or the like. As shown in FIGS. 1 and 2, the tire 101, which serves as the gas leak inspection target in the present embodiment, is used in a vehicle or the like, and is formed in an annular shape or a cylindrical shape by an elastic material such as rubber. The outer surface of the tire 101 of the present embodiment includes a ground contact surface 102 and side surfaces 103 and 104. That is to say, the tire 101 has, as an axisymmetric outer surface, the ground contact surface 102 and the side surfaces 103 and 104. The ground contact surface 102 has a cylindrical shape, and extends along an axis A1 of the tire 101. The side surfaces 103 and 104 have an annular shape, and are connected to both axial direction sides of the ground contact surface 102 so as to intersect the axis A1 (for example, orthogonally). The side surfaces 103 and 104 of the tire 101 may, for example, be formed flat or curved. Both axial direction sides of the tire 101 are open. For this reason, as illustrated in FIG. 2, when the tire 101 is inspected for a gas leak, the openings on both sides of the tire 101 are closed with a pair of lid portions (lid) 105 and 106. The tire 101 is configured as a hollow inspection target by closing the openings on both sides of the tire 101 with the pair of lid portions 105 and 106.

The gas filled in the tire 101 at the time of a gas leak inspection may be any type of gas (reactive gas) that reacts with a gas sensor 2, such as hydrogen gas, helium gas, argon gas, or carbon dioxide gas. Furthermore, the gas serving as the detection target may also be a mixed gas including a reactive gas (for example, a mixed gas of 5% hydrogen gas and 95% nitrogen). For example, a low-viscosity gas (for example, a gas having a lower viscosity than the air injected into the tire 101 during use) may be selected as the reactive gas.

As shown in FIGS. 1 and 2, the tire inspection device (gas leak inspection device) 1 according to the present embodiment includes gas sensors 2.

The gas sensors 2 are disposed facing (close to) the outer surface of the tire 101 (hollow inspection target 100). The gas sensors 2 (in particular, a detection surface 13 described below) are disposed close to the outer surface of the tire 101, within a range in which contact does not occur with the outer surface of the tire 101 (the ground contact surface 102 and the side surfaces 103 and 104). The gas sensors 2 detect the gas that fills the tire 101, on the outside of the tire 101. The gas sensors 2 detect the reactive gas described above, or a mixed gas including the same. The gas sensors 2 detect the concentration of the reactive gas. The gas sensors 2 output the detected concentration of the reactive gas as an electric signal (for example, a voltage value).

As shown in FIGS. 3A to 3E, 13A, and 13B, the gas sensors 2 of the present embodiment include a sensor body (detection unit, detector) 11 that detects a gas, and an extension portion 12 having an opening with a larger area than that of the sensor body 11.

The sensor body 11 has a detection surface 13 that detects a gas. For example, the detection surface 13 may be an opening that takes gas into the inside. The extension portion 12 has an opening with a larger area than the detection surface 13 (or opening) of the sensor body 11. The extension portion 12 is formed so as to surround the detection surface 13 (or opening) of the sensor body 11. For example, the extension portion 12 may be integrally formed with the sensor body 11. For example, the extension portion 12 may be detachably installed on the sensor body 11.

The gas sensors 2 are disposed such that at least a portion of the opening of the extension portion 12 is facing the outer surface of the tire 101.

Figure 3A:
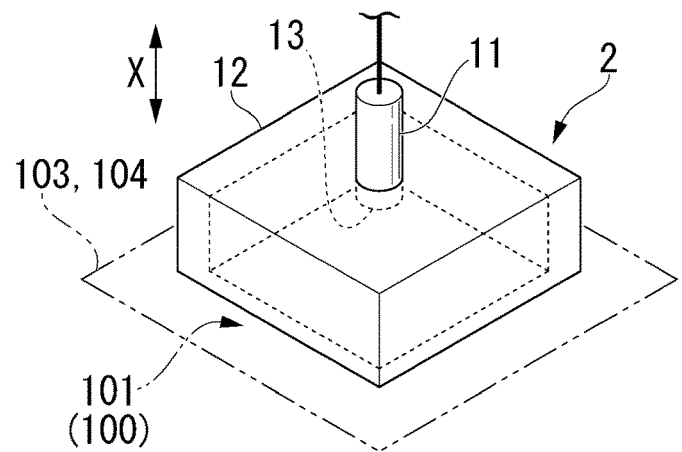
FIG. 3A is a perspective view showing a configuration example of a gas sensor in the tire inspection device shown in FIG. 1.

The specific shape of the extension portion 12 may be arbitrary. As illustrated in FIG. 3A, the extension portion 12 may be formed in a box shape or bowl shape that opens only in the direction that the detection surface 13 is facing (the direction indicated by arrow X in FIG. 3A). In this case, the sensor body 11 is disposed such that the detection surface 13 faces the outer surface of the tire 101.

Figure 3B:
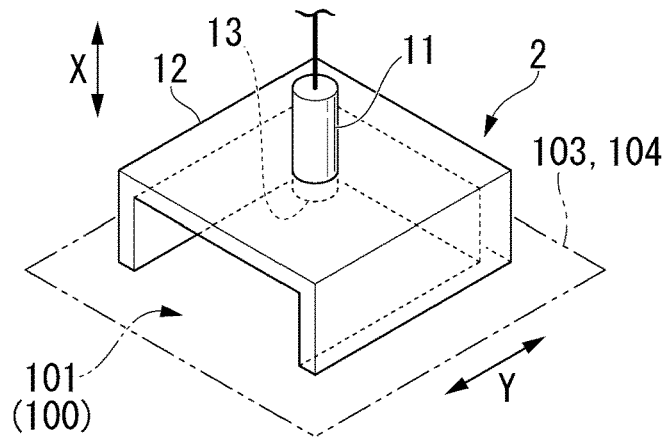
FIG. 3B is a perspective view showing a configuration example of a gas sensor in the tire inspection device shown in FIG. 1.
Figure 3C:
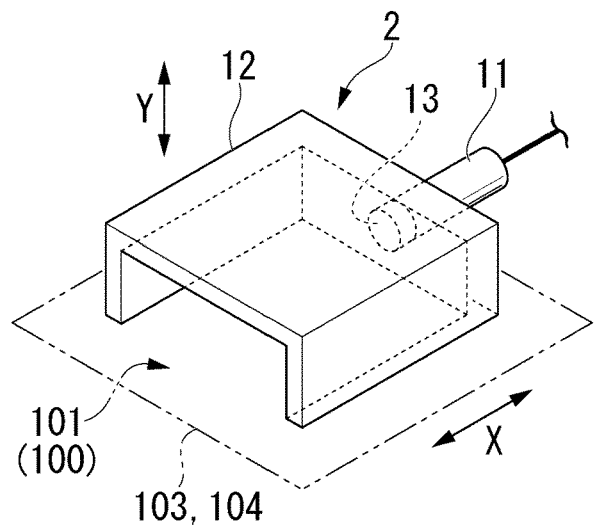
FIG. 3C is a perspective view showing a configuration example of a gas sensor in the tire inspection device shown in FIG. 1.
Figure 3D:
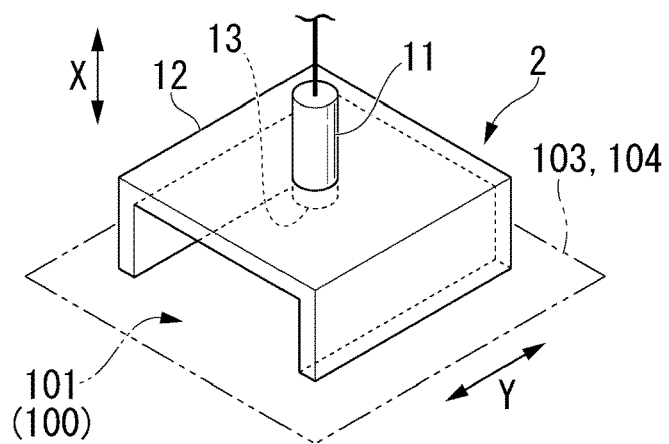
FIG. 3D is a perspective view showing a configuration example of a gas sensor in the tire inspection device shown in FIG. 1.
Figure 13A:
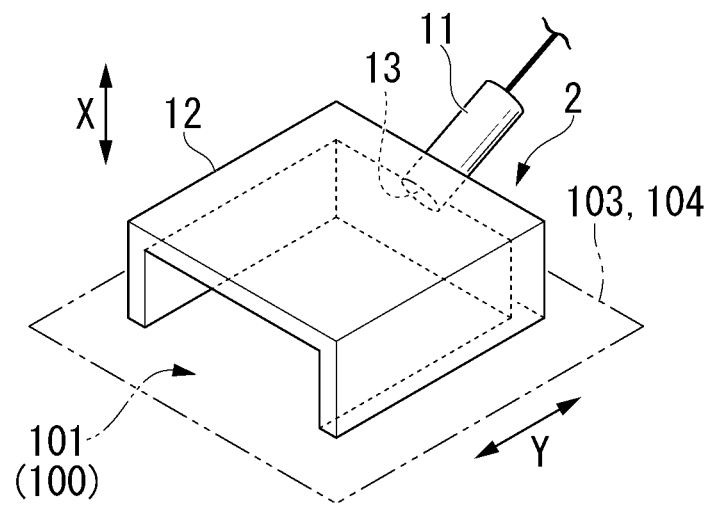
FIG. 13A is a perspective view showing another configuration example of a gas sensor in the tire inspection device shown in FIG. 1.

As illustrated in FIG. 3B, FIG. 3C, FIG. 3D, and FIG. 13A, the extension portion 12 may be formed open in the direction that the detection surface 13 is facing (the direction indicated by arrow X in FIG. 3B, FIG. 3C, FIG. 3D, and FIG. 13A), and open in one direction along the detection surface 13 (the direction indicated by arrow Y in FIG. 3B, FIG. 3C, FIG. 3D, and FIG. 13A). In this case, as illustrated in FIG. 3D, the extension portion 12 may be formed open on both sides in the one direction, such that a gas passes through the extension portion 12 through the openings on both sides of the extension portion 12. Furthermore, as illustrated in FIG. 3B, FIG. 3C, and FIG. 13A, the extension portion 12 may be formed open on only one side in the one direction, such that a gas taken into the inside of the extension portion 12 from the opening on one side of the extension portion 12 does not pass through the extension portion 12.

Figure 3E:
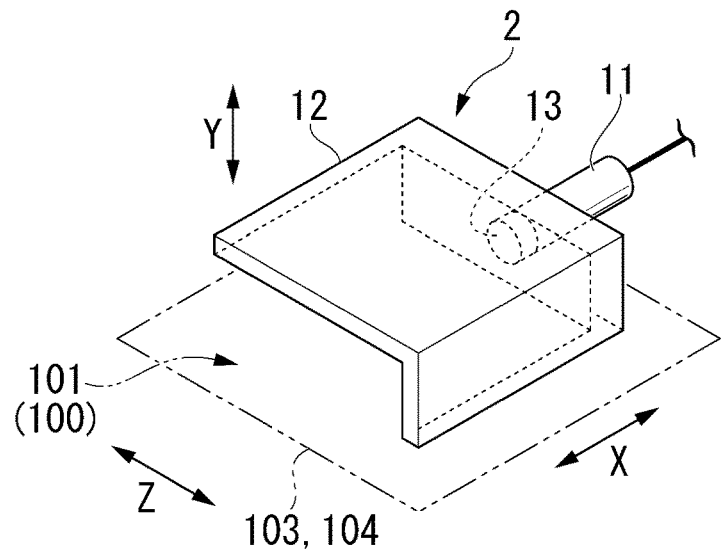
FIG. 3E is a perspective view showing a configuration example of a gas sensor in the tire inspection device shown in FIG. 1.
Figure 13B:
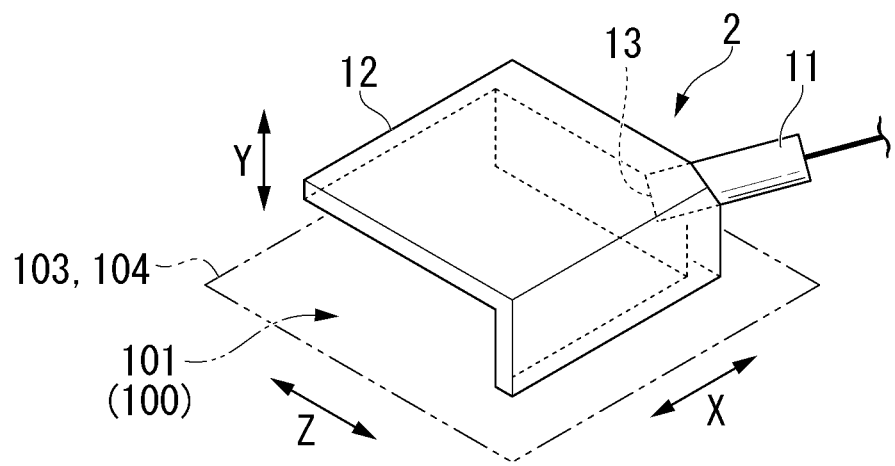
FIG. 13B is a perspective view showing another configuration example of a gas sensor in the tire inspection device shown in FIG. 1.

As illustrated in FIG. 3E and FIG. 13B, the extension portion 12 may be formed open in the direction that the detection surface 13 is facing (the direction indicated by arrow X in FIG. 3E and FIG. 13B), open in one direction along the detection surface 13 (the direction indicated by arrow Yin FIG. 3E and FIG. 13B), and further, may be formed open in a direction orthogonal to the one direction along the detection surface 13 (orthogonal direction: the direction indicated by arrow Z in FIG. 3E and FIG. 13B). In this case, as illustrated in FIG. 3E and FIG. 13B, the extension portion 12 may be formed open on one side in the one direction, and formed open on one side in the orthogonal direction. Furthermore, for example, the extension portion 12 may be formed open on both sides in the one direction, and formed open on both sides in the orthogonal direction. In the gas sensor 2 illustrated in FIG. 3E, although the inspection surface 13 of the sensor body 11 is disposed facing the X direction, it is not limited to such a configuration. For example, the detection surface 13 may be disposed facing the Z direction.

A case where the extension portion 12 is open in a plurality of directions will be described. In this case, as illustrated in FIG. 3B and FIG. 3D, the detection surface 13 of the sensor body 11 may be disposed facing the outer surface of the tire 101. As illustrated in FIG. 3C, FIG. 3E, FIG. 13A, and FIG. 13B, the detection surface 13 may be disposed so as to intersect (orthogonally in FIG. 3C and FIG. 3E) the outer surface of the tire 101.

A case where the extension portion 12 is open in a plurality of directions, that is to say, a case where the extension portion 12 has a plurality of opening surfaces facing mutually different directions will be described. In this case, as illustrated in FIG. 3B, FIG. 3C, FIG. 3D, and FIG. 3E, the inspection surface 13 of the sensor body 11 may be disposed facing one of the opening surfaces of the extension portion 12. Furthermore, as illustrated in FIG. 13A, the inspection surface 13 of the sensor body 11 may be disposed facing a corner portion between two opening surfaces facing in mutually different directions. Moreover, as illustrated in FIG. 13B, the inspection surface 13 of the sensor body 11 may be disposed facing a corner portion between three opening surfaces facing in mutually different directions.

The gas sensors 2 are disposed facing at least part of the circumferential direction area of the outer surface of the tire 101. As shown in FIGS. 1 and 2, the gas sensors 2 of the present embodiment are disposed facing the side surfaces 103 and 104 of the tire 101. The gas sensors 2 may be disposed, for example, facing the ground contact surface 102 of the tire 101. Furthermore, the gas sensors 2 may be disposed, for example, facing the ground contact surface 102 and both side surfaces 103 and 104 of the tire 101. The number of gas sensors 2, for example, may be one, but is more than one in the present embodiment.

The plurality of gas sensors 2 are arranged mutually spaced apart. In the present embodiment, the plurality of gas sensors 2 are arranged about an axis A1 of the tire 101 and spaced apart in the circumferential direction of the tire 101. Although the plurality of gas sensors 2 may be arranged, for example, unequally spaced apart in the circumferential direction of the tire 101, in the present embodiment they are arranged equally spaced apart in the circumferential direction of the tire 101. In the present embodiment, two gas sensors 2 are arranged in the circumferential direction of the tire 101.

Although the gas sensors 2 may be disposed, for example, facing only one side surface 103 of the tire 101, in the present embodiment, they are disposed facing both side surfaces 103 and 104 of the tire 101. The gas sensor 2 facing the one side surface 103 and the gas sensor 2 facing the other side surface 104 may be positioned offset from each other in the circumferential direction of the tire 101, but in the present embodiment, they are positioned so as to coincide with each other.

The tire inspection device 1 of the present embodiment includes a movement unit (movement device) 3. The movement unit 3 relatively moves the tire 101 and the gas sensors 2 so that the gas sensors 2 move along the outer surface of the tire 101. That is to say, the movement unit 3 relatively moves the tire 101 and the gas sensors 2 while causing the gas sensors 2 to face the outer surface of the tire 101. The movement unit 3 relatively moves the tire 101 and the gas sensors 2 so that the distance from the outer surface of the tire 101 to the gas sensors 2 is kept constant. The relative movement direction and the like of the tire 101 and the gas sensor 2 caused by the movement unit 3 may be arbitrary. The movement unit 3 of the present embodiment relatively moves the tire 101 and the gas sensors 2 about the axis A1 of the tire 101.

The movement unit 3 may, for example, move the gas sensors 2 along the outer surface of the tire 101. In this case, the movement unit 3 may include, for example, a robot arm that moves the gas sensors 2, and a computer that controls the robot arm so that the gas sensors 2 move according to the shape of the outer surface of the tire 101. The movement unit 3 of the present embodiment moves the tire 101 so that the gas sensors 2 move along the outer surface of the tire 101. More specifically, the movement unit 3 of the present embodiment is configured by a rotation driver 3A that rotates the tire 101 about its axis A1. The specific configuration of the rotation driver 3A may be arbitrary. The rotation driver 3A is configured by a stepping motor capable of recognizing the rotational position of the tire 101.

The rotation driver 3A may, for example, be connected to a base on which the tire 101 is placed. The rotation driver 3A of the present embodiment is connected to a first lid portion 105 that closes an opening of the tire 101. As a result, the axis A1 of the tire 101 and the axis A2 of the rotation driver 3A can be easily matched.

Although the gas sensors 2 of the present embodiment do not move, they may, for example, move along the outer surface of the tire 101. That is to say, for example, the movement unit 3 may include, in addition to the rotation driver 3A that rotates the tire 101, a gas sensor movement unit that moves the gas sensors 2 along the outer surface of the tire 101 in a direction which is orthogonal to the movement direction of the outer surface of the tire 101 (the radial direction or the axial direction of the tire 101). For example, if the gas sensors 2 are disposed facing the side surfaces 103 and 104 of the tire 101 as shown in FIGS. 1 and 2, the gas sensor movement unit may move the gas sensors 2 in the radial direction of the tire 101. For example, if the gas sensors 2 are disposed facing the ground contact surface 102 of the tire 101, the gas sensor movement unit may move the gas sensors 2 in the axial direction of the tire 101.

The plurality of gas sensors 2 may be arranged, for example, in a direction orthogonal to the movement direction of the outer surface of the tire 101 (for example, the radial direction or the axial direction of the tire 101).

The tire inspection device 1 of the present embodiment includes a gas supply and discharge unit 4. The gas supply and discharge unit 4 includes a gas supply unit that supplies a reactive gas, or a mixed gas including the same, to the inside of the tire 101. The gas supply and discharge unit 4 includes a gas discharge unit that discharges the reactive gas or the mixed gas from the inside of the tire 101. In the present embodiment, the supply and discharge of the gas by the gas supply and discharge unit 4 with respect to the tire 101 is controlled by a PLC 15 described below. The gas supply and discharge unit 4 is configured by appropriately combining, for example, a supply source of the reactive gas or a mixed gas including the same (not shown), a gas supply pipe that connects the supply source to the inside of the tire 101 (not shown), a gas discharge pipe that connects the inside of the tire 101 to the outside (not shown), and a valve provided to the pipe that switches between flowing the gas through the pipe and shutting off the flow (not shown). For example, the supply source may be a gas cylinder. In FIGS. 1 and 2, a pipe 14 of the gas supply and discharge unit 4 is connected to a second lid portion 106 that closes an opening of the tire 101. The pipe 14 of the gas supply and discharge unit 4 serves as both the gas supply pipe and the gas discharge pipe.

As shown in FIG. 1, the tire inspection device 1 of the present embodiment includes a position detection unit (position detection device, detector) 5, a determination unit (determination device) 6, and a leak position specification unit (leak position specification device) 7.

The position detection unit 5 detects the positions of the gas sensors 2 on the outer surface of the tire 101 based on a relative movement time or movement distance of the tire 101 and the gas sensors 2 caused by the movement unit 3. The movement time may be a length of time in which the tire 101 and the gas sensors 2 are relatively moved by the movement unit 3. The movement distance may be a distance in which the tire 101 and the gas sensors 2 are relatively moved by the movement unit 3. The position detection unit 5 of the present embodiment detects the positions of the gas sensors 2 in the circumferential direction of the tire 101. If the gas sensors 2 move in the radial direction or the axial direction of the tire 101, the position detection unit 5 may detect, for example, the positions of the gas sensors 2 in the radial direction or the axial direction of the tire 101. The position detection unit 5 of the present embodiment detects the positions of each of the plurality of gas sensors 2.

The position detection unit 5 of the present embodiment is configured by a PLC (Programmable Logic Controller) 15 and a rotation driver 3A. The PLC 15 is configured as a control unit that controls the various operations of the tire inspection device 1, and a data management unit that manages the various data required by the tire inspection device 1. The PLC 15 detects the positions of the gas sensors 2 with respect to the outer surface of the tire 101 based on data relating to the rotational position of the tire 101 sent from the rotation driver 3A. Furthermore, the PLC 15 also controls the operations of the rotation driver 3A (driving, stopping, speed adjustment, and the like).

The determination unit 6 determines whether or not a gas leak has occurred in the tire 101 based on the concentration of the reactive gas detected by the gas sensors 2. The determination unit 6 determines that "a gas leak has not occurred in the tire 101 (there are no defects such as holes in the tire 101)" if the concentration of the reactive gas detected by the gas sensors 2 is less than or equal to, or lower than, a predetermined threshold. Furthermore, the determination unit 6 determines that "a gas leak has occurred in the tire 101 (there are defects such as holes in the tire 101)" if the concentration of the reactive gas detected by the gas sensors 2 is greater than or equal to the predetermined threshold.

The determination unit 6 of the present embodiment is configured by a PLC 15 and a gas measurement unit 16. The gas measurement unit 16 is connected to the gas sensors 2. The gas measurement unit 16 converts an electrical signal (voltage value) output from each gas sensor 2 into (a value representing) the concentration of the reactive gas. The reference data for converting an electrical signal into a concentration of the reactive gas, for example, may be stored in the gas measurement unit 16, but in the present embodiment it is stored in the PLC 15. For this reason, when an electrical signal is converted into a concentration of the reactive gas in the gas measurement unit 16, the reference data described above is sent from the PLC 15 to the gas measurement unit 16. The concentrations of the reactive gas (or voltage values) obtained by the gas measurement unit 16 are sent to the PLC 15 in a state where they are associated with the gas sensors 2.

The PLC 15 stores in advance, threshold data for determining whether or not a gas leak has occurred in the tire 101. The threshold may be a concentration of the reactive gas, or may be a voltage value. The PLC 15 compares the concentration of the reactive gas (or voltage value) sent from the gas measurement unit 16 with the threshold described above, and determines whether or not a gas leak has occurred in the tire 101.

The gas measurement unit 16 described above may include, for example, a display unit that displays the concentration of the reactive gas. The display unit of the gas measurement unit 16 may display, for example, the voltage values output from the gas sensors 2. In the present embodiment, the gas measurement unit 16 is connected to a voltmeter 17. The voltmeter 17 displays the voltage values output from the gas sensors 2.

A case where the determination unit 6 described above determines that "a gas leak has occurred in the tire 101" will be described. In this case, the leak position specification unit 7 associates the positions of the gas sensors 2 detected by the position detection unit 5 (positions of the gas sensors 2 with respect to the outer surface of the tire 101) and the concentrations of the reactive gas detected by the gas sensors 2, and specifies the position where the gas leak has occurred in the tire 101. The leak position specification unit 7 of the present embodiment is configured by a PLC 15.

In the present embodiment, the PLC 15 associates the positions of the gas sensors 2 and the concentrations of the reactive gas detected by the gas sensors 2, irrespective of the presence of a gas leak. The data, in which the positions of the gas sensors 2 and the concentrations of the reactive gas are associated, may be sent to a PC (personal computer) 18 and stored in a storage unit of the PC 18, or displayed on a display unit of the PC 18. Data that specifies the inspected tire 101 (for example, an identification number) may be further associated with the associated data described above. The PLC 15 may associate data that specifies the inspected tire 101 (for example, an identification number) with data that indicates the presence of a gas leak in the corresponding tire 101.

Furthermore, in the present embodiment, the PLC 15 may send the associated data described above to various peripheral devices 19 when the position where the gas leak has occurred in the tire 101 is specified.

The peripheral device 19 may be, for example, an additional tire inspection device (additional gas leak inspection device) 50 described below, a sorting device that sorts a tire 101 as a non-defective product (a tire 101 having no defects) or a defective product (a tire 101 having defects), or various production devices that produce the tire 101. In a case where the peripheral device 19 represents a sorting device, the sorting device is capable of efficiently sorting the tire 101 as a non-defective product or a defective product based on the data sent from the PLC 15. In a case where the peripheral device 19 represents various production devices, the PLC 15 sends the associated data described above to the production device associated with the gas leak position in the tire 101, so that the corresponding production device can be repaired at an early stage.

The tire inspection device 1 of the present embodiment, together with the additional tire inspection device 50 shown in FIGS. 4 to 7, configures a tire inspection system (gas leak inspection system).

The additional tire inspection device 50 covers a partial area of an outer surface of the tire 101, and detects the presence of a gas leak in the area. The additional tire inspection device 50 includes a gas sensor 51 (hereunder, referred to as a second gas sensor 51) having the same functions as the gas sensors 2 (hereunder, referred to as first gas sensors 2) of the tire inspection device 1 described above.

The second gas sensor 51 includes a sensor body 52 and a cover portion 53. The sensor body 52 is configured in the same manner as in the first gas sensors 2 of the tire inspection device 1. The cover portion 53 is installed on a detection surface 54 side of the sensor body 52. That is to say, the cover portion 53 is installed on an end portion of the sensor body 52 on the detection surface 54 side. The sensor body 52 is disposed such that the detection surface 54 faces the outer surface of the tire 101. The cover portion 53 is formed in a bowl shape surrounding the detection surface 54, and covers a partial area of the outer surface of the tire 101. Open ends 55 (55A and 55B) of the cover portion 53 make contact with the outer surface of the tire 101. The open ends 55 of the cover portion 53 may be formed such that a gap is not generated, or a gap is reduced, with respect to the outer surface of the tire 101. The open ends 55 of the cover portion 53 are formed of a soft material such as rubber.

Figure 4:
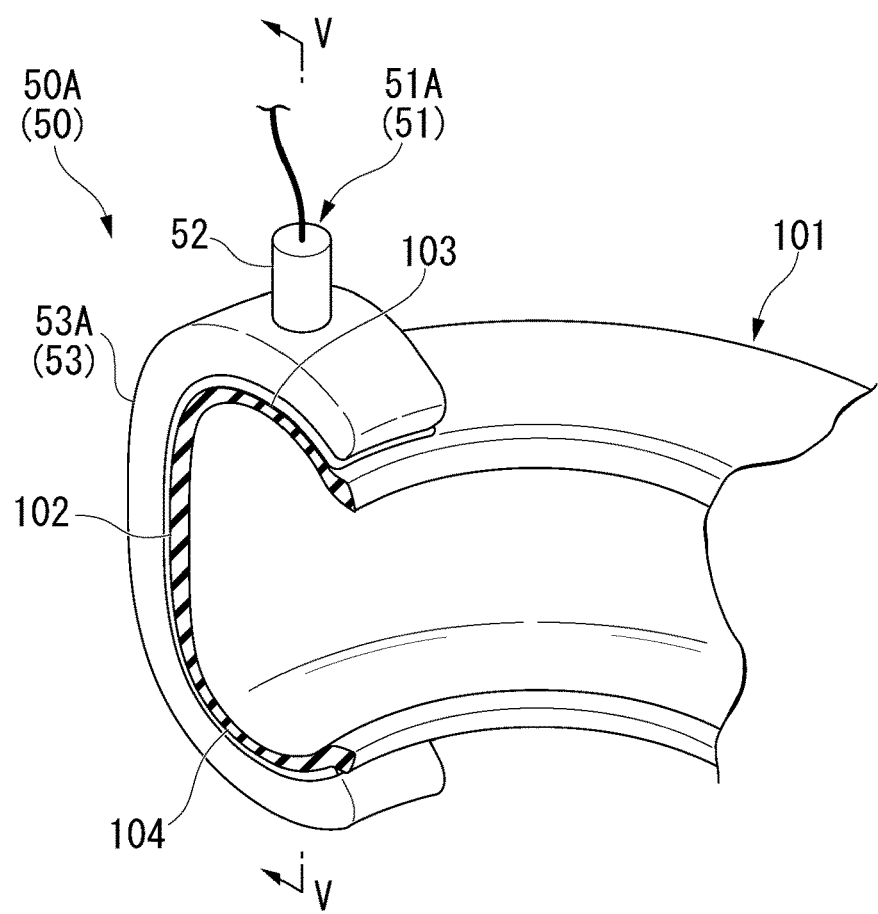
FIG. 4 is a perspective view showing a first configuration example of an additional tire inspection device of a tire inspection system according to the first embodiment of the present invention.
Figure 5:
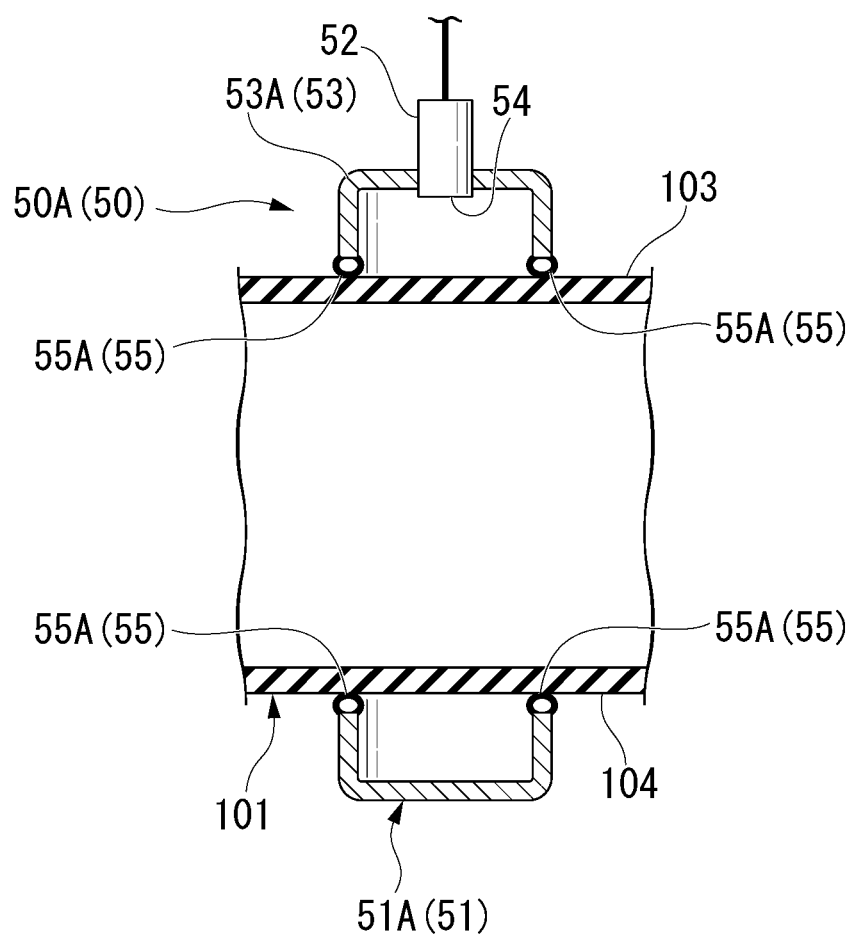
FIG. 5 is a cross-sectional view as viewed along arrow V-V in FIG. 4.
Figure 6:
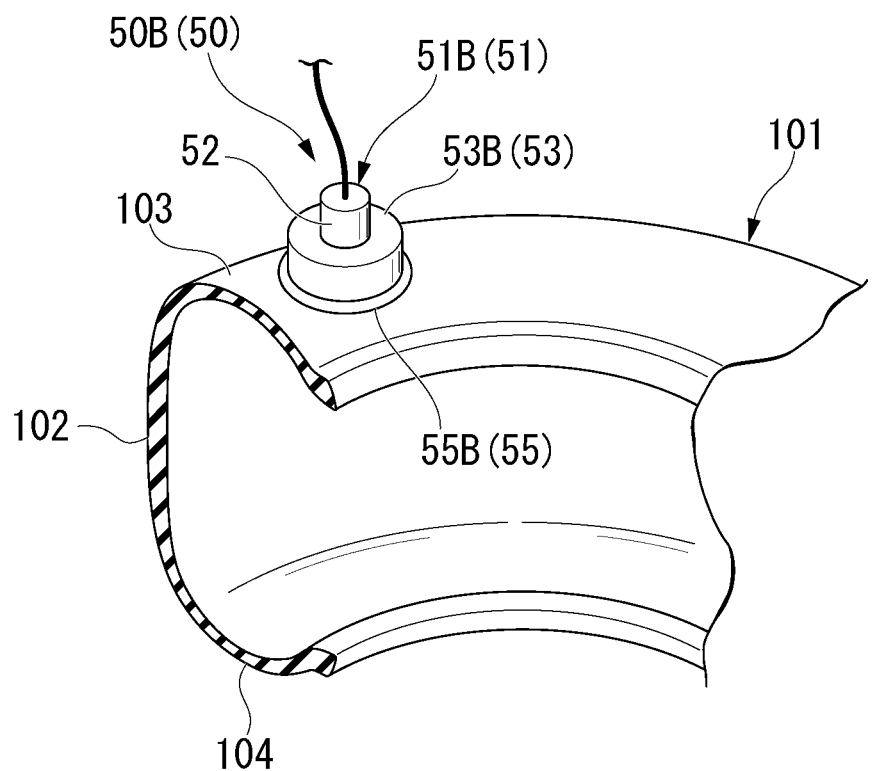
FIG. 6 is a perspective view showing a second configuration example of an additional tire inspection device of a tire inspection system according to the first embodiment of the present invention.
Figure 7:
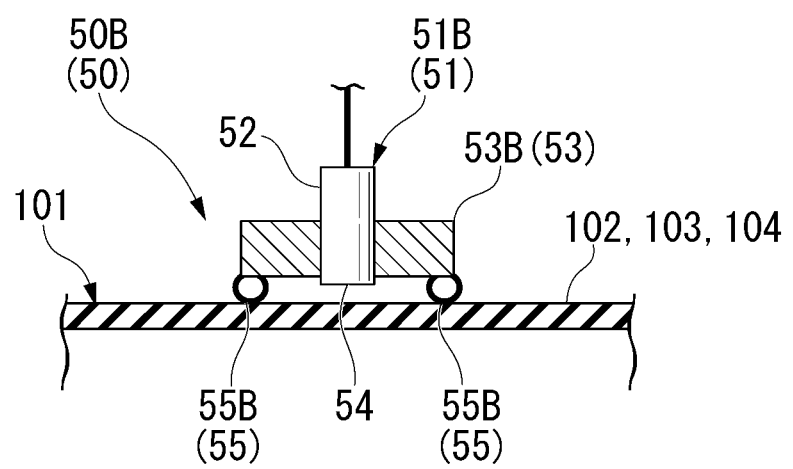
FIG. 7 is a cross-sectional view showing a second configuration example of the additional tire inspection device shown in FIG. 6.

Specific examples of the additional tire inspection device 50 of the present embodiment include a first additional inspection device 50A illustrated in FIGS. 4 and 5, and a second additional inspection device 50B illustrated in FIGS. 6 and 7. The area of the outer surface of the tire 101 covered by the cover portion 53 of a second gas sensor 51A of the first additional inspection device 50A is larger than that covered by a second gas sensor 51B of the second additional inspection device 50B.

In the second gas sensor 51A of the first additional inspection device 50A shown in FIGS. 4 and 5, the cover portion 53 covers all of the partial area in the circumferential direction of the tire 101 on the outer surface of the tire 101. Specifically, the cover portion 53A covers the ground contact surface 102 of the tire 101 and the pair of side surfaces 103 and 104 positioned on both sides thereof in a part of the circumferential direction of the tire 101. For this reason, the cover portion 53A in the first additional inspection device 50A is formed in a belt shape extending in the arrangement direction of the one side surface 103, the ground contact surface 102, and the other side surface 104 of the tire 101.

The cover portion 53A in the first additional inspection device 50A may be formed, for example, in a bellows shape or formed of an elastic material such as rubber, such that it elastically expands and contracts in the arrangement direction of the one side surface 103, the ground contact surface 102, and the other side surface 104. In this case, the cover portion 53A can be held on the tire 101 by the elastic force of the cover portion 53A. Further, the cover portion 53A is also capable of supporting a plurality of types of tires 101 having different sizes.

In the second gas sensor 51B of the second additional inspection device 50B shown in FIGS. 6 and 7, the cover portion 53B covers a small partial area of the outer surface of the tire 101. Specifically, the open end 55B of the cover portion 53B in the second additional inspection device 50B has a flat shape in a state where no external force is applied to the open end 55B. That is to say, the cover portion 53B in the second additional inspection device 50B is formed covering an area of the outer surface of the tire 101 which is flat or has a small curvature. The open end 55B of the cover portion 53B illustrated in FIGS. 6 and 7 is formed having an annular shape, but may be formed having an arbitrary shape such as a rectangular ring shape.

The additional tire inspection device 50 may include, in addition to the second gas sensor 51 described above, the same gas supply and discharge unit 4, position detection unit 5, and determination unit 6 as those provided in the tire inspection device 1 (see FIG. 1). Furthermore, the additional tire inspection device 50 may include the same PLC 15, gas measurement unit 16, voltmeter 17, and PC 18 as those provided in the tire inspection device 1 (see FIG. 1). As in the case of the tire inspection device 1, the PLC 15 in the additional tire inspection device 50 may send data specifying the position where the gas leak has occurred in the tire 101 to various peripheral devices 19 (see FIG. 1).

Next, a tire inspection method (gas leak inspection method) using the tire inspection system of the present embodiment will be described.

Figure 11:
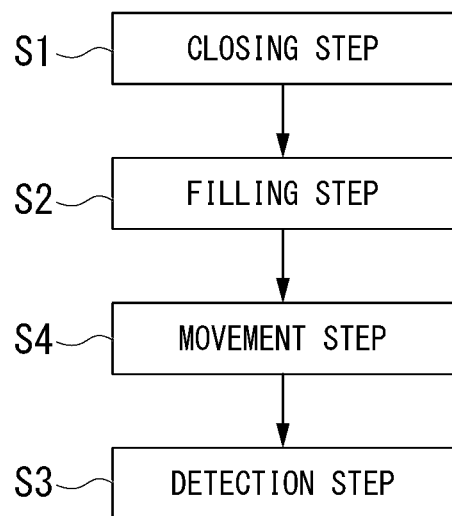
FIG. 11 is a flowchart showing an example of a tire inspection method according to the first embodiment of the present invention.

In the tire inspection method of the present embodiment, the tire 101 is firstly inspected for a gas leak using the tire inspection device 1. As shown in FIG. 11, the tire inspection method using the tire inspection device 1 includes a closing step S1, a filling step S2, and a detection step S3. Furthermore, the tire inspection method using the tire inspection device 1 also includes a movement step S4.

In the closing step S1, the openings of the tire 101 are closed. The closing step S1 of the present embodiment is performed by closing the openings of the tire 101 using the lid portions 105 and 106. In the filling step S2, the tire 101 is filled with gas (the reactive gas or a mixed gas including the same). The filling step S2 is performed at least after the closing step S1. The filling step S2 of the present embodiment is performed by the gas supply and discharge unit 4.

In the detection step S3, the gas that fills the tire 101 is detected in the atmosphere outside the tire 101. The detection step S3 is performed at least after the filling step S2 is started. The gas detection in the detection step S3 of the present embodiment is performed by the first gas sensors 2.

In the movement step S4, the tire 101 and the first gas sensors 2 are relatively moved so that the gas sensors 2 move along the outer surface of the tire 101. The movement step S4 of the present embodiment is performed by the rotation driver 3A (movement unit 3). The movement step S4 is performed at least when the detection step S3 is performed. That is to say, as illustrated in FIG. 11, the movement step S4 may be started before the detection step S3 is performed, or may be started, for example, simultaneously with the detection step S3.

In the tire inspection method using the tire inspection device 1, the tire 101 is rotated about its axis A1 so that the gas sensors 2 move along the outer surface of the tire 101. For this reason, if a gas is leaking out from the tire 101, the tire inspection device 1 is capable of specifying the gas leak position (gas leak area) in at least the circumferential direction of the tire 101.

Then, the additional tire inspection device 50 is used to inspect a partial area of the outer surface of the tire 101 for the presence of a gas leak. The gas leak inspection by the additional tire inspection device 50 may be performed only with respect to a tire 101 that is determined to have a gas leak by the tire inspection device 1 described above. The area of the outer surface of the tire 101 covered by the additional tire inspection device 50 (the cover portion 53 of the second gas sensor 51A) can be determined based on data relating to the gas leak position specified by the tire inspection device 1. As a result, the gas leak inspection using the additional tire inspection device 50 can be efficiently performed. Furthermore, the additional tire inspection device 50 is capable of more precisely specifying the gas leak position in the tire 101.

In the present embodiment, when a gas leak in the tire 101 is detected using the additional tire inspection device 50, the gas leak position (gas leak area) in the circumferential direction of the tire 101 is more precisely specified using the first additional inspection device 50A. At this time, the presence of a gas leak in the area of the outer surface of the tire 101 covered by the second gas sensor 51A may be inspected while changing the position of the second gas sensor 51A of the first additional inspection device 50A in the circumferential direction of the tire 101.

Then using the second additional inspection device 50B, the gas leak position in the arrangement direction of the one side surface 103, the ground contact surface 102, and the other side surface 104 of the tire 101 is more precisely specified. At this time, the presence of a gas leak in the area of the outer surface of the tire 101 covered by the second gas sensor 51A may be inspected while changing the position of the second gas sensor 51B of the second additional inspection device 50B inside the area of the outer surface of the tire 101 where the gas leak was detected by the first additional inspection device 50A.

As described above, according to the tire inspection device 1, the additional tire inspection device 50, and the tire inspection method of the present embodiment, a gas that leaks out from the tire 101 is detected by the gas sensors 2 and 51. For this reason, compared with a conventional inspection method that confirms a gas leak in the tire 101 by visual observation, the occurrence of human errors can be suppressed, and a gas leak in the tire 101 can be inspected easily and with certainty. Further, because it is not necessary to wet the tire 101 as in the conventional inspection method, the step of drying the tire 101 (drying step) is not required, and a gas leak in the tire 101 can be easily inspected in a short time.

Furthermore, because the drying step is not necessary, it is possible to efficiently repair defects in the tire 101. The tire 101 can be repaired using a conventionally known repair kit or member. The repair of the tire 101, for example, may be performed manually, or, for example, may be performed by a robot.

Moreover, in the tire inspection device 1 of the present embodiment, a plurality of gas sensors 2 are arranged mutually spaced apart. For this reason, it becomes possible to recognize the area of the outer surface of the tire 101 from which the gas is leaking. In particular, in the present embodiment, the gas sensors 2 are arranged spaced apart in the circumferential direction of the tire 101, centered on the axis A1 of the tire 101. For this reason, the area of the gas leak in the circumferential direction of the tire 101 on the outer surface of the tire 101 can be recognized. Moreover, the tire inspection device 1 of the present embodiment is capable of detecting a gas that has leaked out from a tire in a shorter time compared to a case where there is only one gas sensor. In addition, a gas that has leaked out from a tire can be detected in a short time, even when the size of the tire is large.

Furthermore, in the tire inspection device 1 of the present embodiment, the gas sensors 2 (in particular, the detection surfaces 13) are disposed facing the side surfaces 103 and 104 of the tire 101. For this reason, a gas leak in the side surface 103 or 104 of the tire 101 can be particularly inspected. Moreover, if the gas sensors 2 (in particular, the detection surfaces 13) are disposed facing the ground contact surface 102 of the tire 101, a gas leak in the ground contact surface 102 of the tire 101 can be particularly inspected. That is to say, in the tire inspection device 1 of the present embodiment, a gas leak inspection can be performed according to the outer surface parts (the ground contact surface 102 and the side surfaces 103 and 104) of the tire. It is also possible to specify a more precise gas leak position in a short time by increasing the number of gas sensors 2 to an extent that the gas sensors 2 substantially cover the whole tire 101.

Furthermore, the tire inspection device 1 and the tire inspection method of the present embodiment are capable of detecting a gas that has leaked out from the tire 101 using the gas sensors 2, while relatively moving the tire 101 and the gas sensors 2 so that the gas sensors 2 move along the outer surface of the tire 101. As a result, it becomes possible to easily recognize the gas leak position on the outer surface of the tire 101 in a short time. That is to say, it becomes possible to easily recognize the gas leak position in the tire 101 in a short time without the occurrence of human errors.

Furthermore, in the tire inspection device 1 of the present embodiment, the tire 101 and the gas sensors 2 relatively move about the axis A1 of the tire 101. For this reason, it becomes possible to easily recognize the gas leak position in the circumferential direction of the tire 101 in a short time.

Moreover, the tire inspection device 1 and the tire inspection method of the present embodiment are capable of detecting a gas that has leaked out from the tire 101 using the gas sensors 2, while relatively moving the tire 101 and the gas sensors 2 about the axis A1 of the tire 101. As a result, it becomes possible to efficiently recognize the gas leak position in the circumferential direction of the outer surface of the tire 101, which is formed having an annular shape or a cylindrical shape.

Furthermore, in the tire inspection device 1 and the tire inspection method of the present embodiment, the tire 101 rotates about its axis A1. For this reason, the configuration of the movement unit 3, which realizes the relative movement of the tire 101 and the gas sensors 2, can be simplified compared to a case where the gas sensors 2 are moved with respect to the tire 101. As a result, a reduction in production cost and size reduction of the tire inspection device 1 can be achieved.

Furthermore, in the tire inspection device 1 of the present embodiment, the plurality of gas sensors 2 are arranged spaced apart in the circumferential direction of the tire 101 centered on the axis A1. For this reason, the area inspected by a single gas sensor 2 in the circumferential direction of the tire 101 can be made smaller. Therefore, the tire inspection device 1 of the present invention is capable of inspecting the entire outer surface (entire circumferential direction) of the tire 101 in a shorter time by suppressing the movement amount (rotation angle) of the tire 101 to be smaller compared to a case where only one gas sensor 2 is disposed in the circumferential direction of the tire 101.

Furthermore, in the tire inspection device 1 of the present embodiment, the plurality of gas sensors 2 are arranged spaced apart in the circumferential direction of the tire 101 centered on the axis A1, and the tire 101 and the gas sensors 2 relatively move about the axis A1 of the tire 101. For this reason, the area inspected by a single gas sensor 2 in the circumferential direction of the tire 101 can be made smaller. Therefore, it is possible to inspect the entire outer surface (entire circumferential direction) of the tire 101 in a shorter time by suppressing the movement amount (rotation angle) of the tire 101 to be smaller compared to a case where only one gas sensor 2 is disposed in the circumferential direction of the tire 101.

Furthermore, the tire inspection device 1 of the present embodiment includes the position detection unit 5, the determination unit 6, and the leak position specification unit 7. As a result, the gas leak position in the circumferential direction of the tire 101 can be specified with certainty.

Moreover, in the tire inspection device 1 of the present embodiment, the gas sensors 2 include the sensor body 11 that detects a gas, and the extension portion 12 having an opening with a larger area than the sensor body 11. For this reason, the gas sensor 2 is capable of detecting a gas leak in the tire 101 in a larger area than the sensor body 11, even if the sensor body 11 (for example, the detection surface 13) is small.

Furthermore, in the tire inspection device 1 of the present embodiment, the gas sensors 2 are disposed facing both side surfaces 103 and 104 of the tire 101. For this reason, the tire inspection device 1 of the present embodiment is capable of inspecting the entire outer surface of the tire 101 for a gas leak in a shorter time compared to a case where the gas sensors 2 are disposed facing only the one side surface 103 of the tire 101. Furthermore, in the tire inspection device 1 of the present embodiment, in addition to rotating the tire 101, if the gas sensors 2 are moved along the outer surface of the tire 101 in the radial direction or the axial direction of the tire 101, the entire outer surface of the tire 101 can be inspected using a smaller number of gas sensors 2. Moreover, it is possible to easily perform a leak inspection with respect to a plurality of types of tires 101 having different sizes.

In addition, the tire inspection device 1 of the present embodiment includes the gas supply and discharge unit 4. For this reason, even when the tire 101 is being inspected for a gas leak using the gas sensors 2, it is possible to supply a gas to the inside of the tire 101, and prevent or suppress a reduction in the amount of gas (gas flow rate per unit time) that leaks out from a defect in the tire 101 to the outside. Furthermore, by increasing the gas pressure inside the tire 101 and increasing the amount of gas that leaks out from the tire 101, it is also possible to perform a gas leak inspection using the gas sensors 2 in a short time.

Moreover, according to the tire inspection system and the tire inspection method of the present embodiment, after inspecting the whole tire 101 for a gas leak using the tire inspection device 1, the additional tire inspection device 50 can be used to inspect a partial area of the tire 101 for a gas leak based on the gas leak inspection result of the tire 101 from the tire inspection device 1. As a result, the gas leak position in the tire 101 can be efficiently and precisely specified.

Furthermore, when an inspection is performed using the tire inspection device 1 and the additional tire inspection device 50 of the present embodiment, if a low-viscosity gas (such as a gas having a lower viscosity than air) is selected as the reactive gas filled in the tire 101, the amount of gas filling the tire 101 that leaks from the tire 101 to the outside (gas flow rate) becomes large compared to a high-viscosity gas (such as air). For this reason, finer defects in the tire 101 can be more easily detected by the gas sensors 2 and 51. Moreover, in the tire inspection device 1 and the tire inspection system of the present embodiment, a gas leak in the tire 101 can be detected in a short time as described above. For this reason, the tire inspection device 1 and the tire inspection system can be incorporated into a production line of the tire 101.

Furthermore, the tire inspection device 1 and the additional tire inspection device 50 of the present embodiment detect a gas that leaks out from the tire 101 using the gas sensors 2 and 51. For this reason, it is possible to inspect the tire 101 for a gas leak without leaving a deposit such as moisture on the tire 101. That is to say, defects in the tire 101 can be efficiently repaired without drying the tire 101 after the gas leak inspection.

Second Embodiment

Next, a second embodiment of the present invention will be described with reference to FIGS. 8, 9, and 12. In the second embodiment, the same components as those in the first embodiment are denoted by the same reference symbols, and description thereof is omitted.

Figure 8:
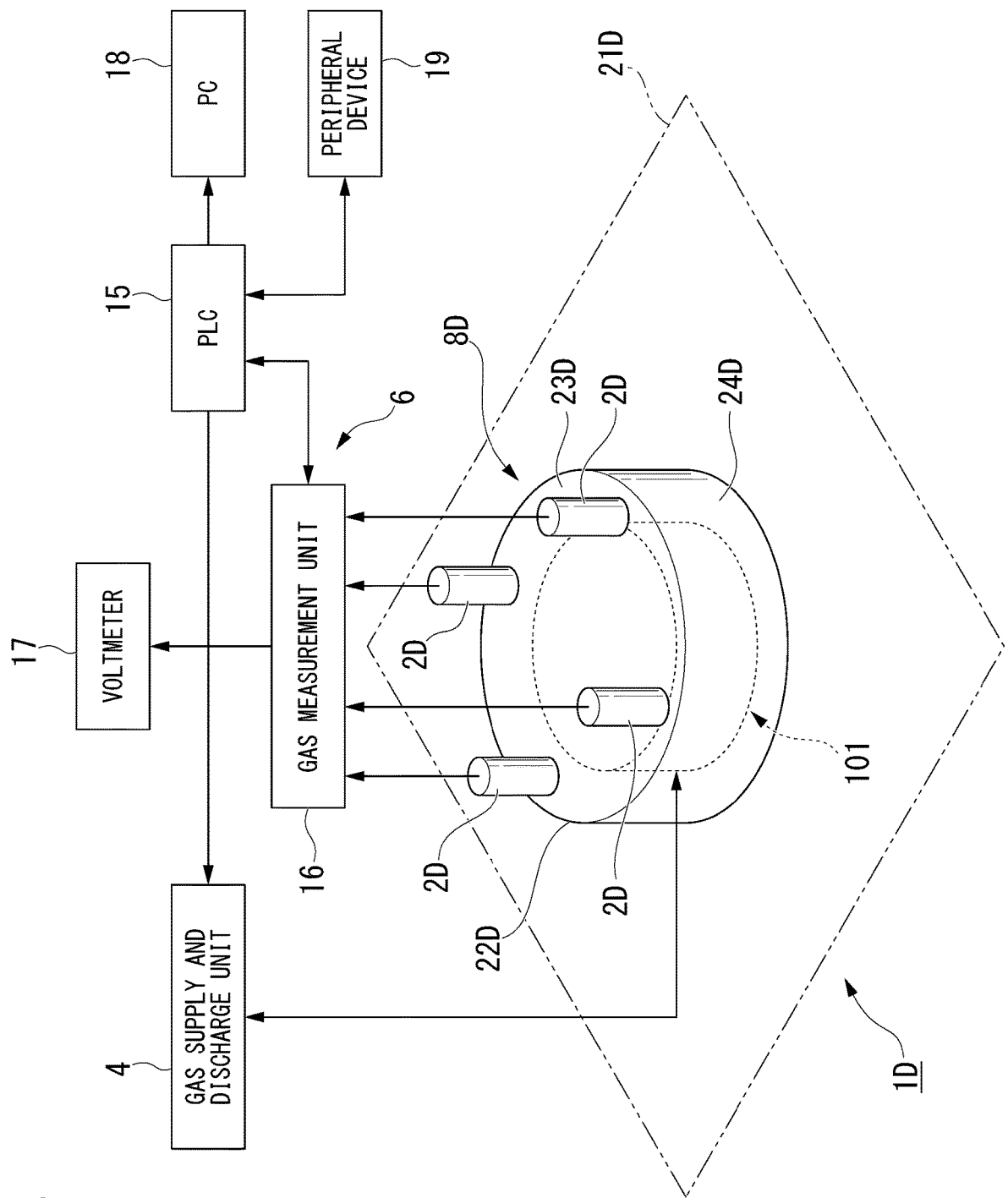
FIG. 8 is a diagram showing a configuration of a tire inspection device according to a second embodiment of the present invention.
Figure 9:
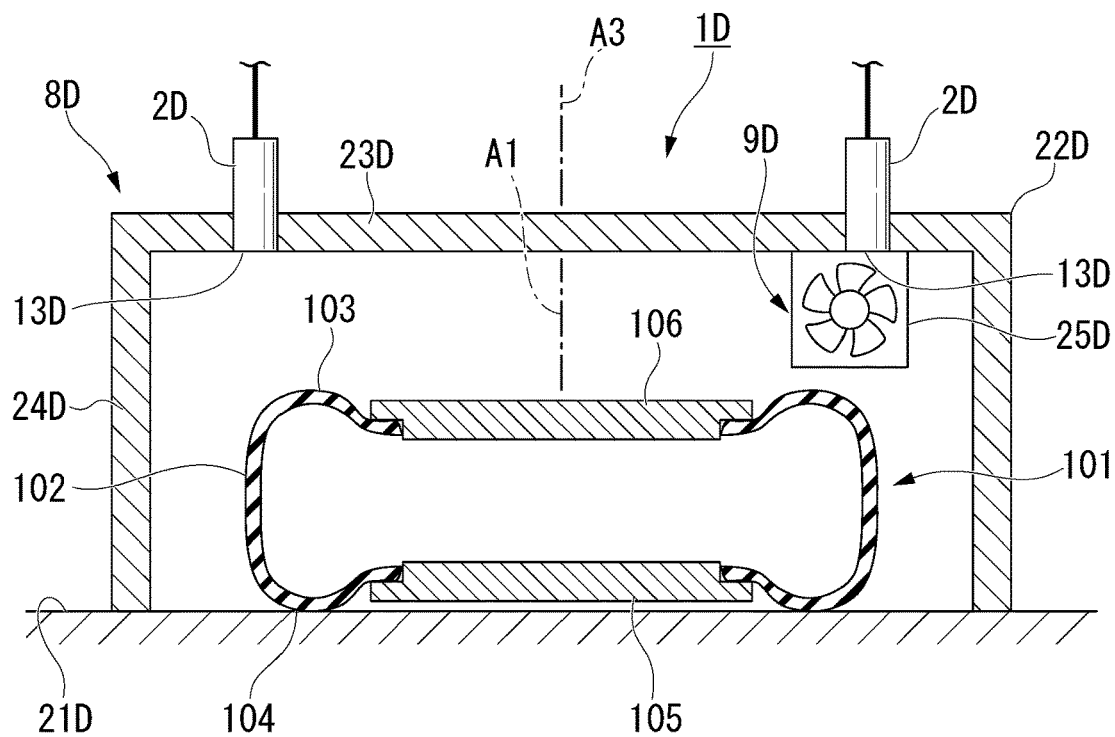
FIG. 9 is a cross-sectional view showing a configuration example of a housing unit, an arrangement example of gas sensors, and a configuration example of a stirring unit in the tire inspection device shown in FIG. 8.

As shown in FIGS. 8 and 9, a tire inspection device 1D of the present embodiment includes gas sensors 2D in the same manner as the tire inspection device 1 of the first embodiment. Further, the tire inspection device 1D of the present embodiment includes a housing unit 8D.

The housing unit 8D houses the tire 101. For example, the housing unit 8D may be configured so as to seal a space in the housing unit 8D with respect to the outside. The housing unit 8D may be configured such that some air flows in and out of the housing unit 8D.

The housing unit 8D may be configured, for example, to surround the whole tire 101. The housing unit 8D of the present embodiment is configured by a hood 22D, which is disposed on a base surface 21D and covers the tire 101 from above. An open end of the hood 22D is open on the base surface 21D side. As illustrated in FIG. 9, the open end of the hood 22D may be in close contact with the base surface 21D without a gap. The open end of the hood 22D may, for example, make contact with the base surface 21D with a slight gap with the base surface 21D. In the present embodiment, the hood 22D is disposed on the base surface 21D such that it can be lifted up from the base surface 21.

The specific shape of the hood 22D may be arbitrary. The hood 22D of the present embodiment includes a top plate portion 23D and a peripheral wall portion 24D. The top plate portion 23D is positioned above the base surface 21D. The peripheral wall portion 24D has a cylindrical shape, and extends in the thickness direction of the top plate portion 23D from the periphery of the top plate portion 23D. That is to say, the hood 22D of the present embodiment is formed in a bottomed cylindrical shape.

The tire 101 is disposed in the housing unit 8D so that the axis A1 of the tire 101 is orthogonal to the base surface 21D. For this reason, the ground contact surface 102 of the tire 101 disposed in the housing unit 8D faces the peripheral wall portion 24D of the hood 22D. Furthermore, the one side surface 103 of the tire 101 faces the top plate portion 23D of the hood 22D. Moreover, the other side surface 104 of the tire 101 faces the base surface 21D. In the present embodiment, the tire 101 is disposed making contact with the base surface 21D. Specifically, the tire 101 is disposed such that the other side surface 104 makes contact with the base surface 21D.

When the tire 101 is disposed on the base surface 21D and covered with the hood 22D, the axis A1 of the tire 101 and the axis A3 of the hood 22D may, for example, be positioned such that they are mutually offset, but they may, for example, coincide with each other as shown in FIG. 9.

The gas sensors 2D have a detection surface 13D that detect a gas, similarly to the sensor body 11 of the gas sensors 2 (first gas sensors 2) of the first embodiment (see FIG. 3A to 3E). The gas sensors 2D detect a gas that leaks out from inside the tire 101 housed in the housing unit 8D.

The gas sensors 2D are provided in the housing unit 8D. The gas sensors 2D may, for example, be disposed inside the housing unit 8D. The gas sensors 2D of the present embodiment are installed on the housing unit 8D. Specifically, the gas sensors 2D are installed on the hood 22D that configures the housing unit 8D. The gas sensors 2D are installed on the hood 22D such that the detection surfaces 13D face the inside of the housing unit 8D.

The gas sensors 2D may, for example, be installed on the peripheral wall portion 24D of the hood 22D. In this case, the detection surfaces 13D of the gas sensors 2D can be made to face the ground contact surface 102 of the tire 101. The gas sensors 2D of the present embodiment are installed on the top plate portion 23D of the hood 22D. For this reason, the detection surfaces 13D of the gas sensors 2D can be made to face the one side surface 103 of the tire 101.

The number of gas sensors 2D, for example, may be one. In the present embodiment, a plurality of gas sensors 2D are provided. The plurality of gas sensors 2D are at least arranged mutually spaced apart. In the present embodiment, the plurality of gas sensors 2D are arranged spaced apart in the circumferential direction of the tire 101 centered on the axis A1. Specifically, the plurality of gas sensors 2D are arranged spaced apart in the circumferential direction of the hood 22D centered on the axis A3 of the hood 22D. Although the plurality of gas sensors 2D may be arranged, for example, unequally spaced apart in the circumferential direction of the tire 101 or the hood 22D, in the present embodiment they are arranged equally spaced apart in the circumferential direction of the tire 101 or the hood 22D.

The tire inspection device 1D of the present embodiment includes a stirring unit (stirring device) 9D. The stirring unit 9D stirs the air inside the housing unit 8D. The specific configuration of the stirring unit 9D may be arbitrary. The stirring unit 9D of the present embodiment is a fan 25D disposed inside the housing unit 8D. The fan 25D may, for example, be disposed on the base surface 21D. The fan 25D of the present embodiment is installed on the hood 22D. The fan 25D may, for example, be installed on the peripheral wall portion 24D of the hood 22D. In the present embodiment, the fan 25D is installed on the top plate portion 23D of the hood 22D.

The fan 25D, for example, is disposed such that an air flow is generated in an arbitrary direction, such as the radial direction or axial direction of the hood 22D or the tire 101. The fan 25D of the present embodiment is disposed at a position away from the axis A1 of the hood 22D or the tire 101, so that an air flow is generated in the circumferential direction of the hood 22D or the tire 101. For this reason, in the present embodiment, the plurality of gas sensors 2D described above are arranged spaced apart in the direction of the air flow generated by the fan 25D.

As shown in FIG. 8, the tire inspection device 1D of the present embodiment may include the same gas supply and discharge unit 4 and determination unit 6 as those provided in the tire inspection device 1 of the first embodiment. Furthermore, the tire inspection device 1D of the present embodiment may include the same PLC 15, gas measurement unit 16, voltmeter 17, and PC 18 as those provided in the tire inspection device 1 of the first embodiment.

In the tire inspection device 1D of the present embodiment, the PLC 15 may associate data that specifies the inspected tire 101 (for example, an identification number) with data that indicates the presence of a gas leak in the corresponding tire 101. The associated data is sent to the PC 18, and may be stored in a storage unit of the PC 18, or displayed on a display unit of the PC 18.

Furthermore, in the present embodiment, as in the first embodiment, the PLC 15 may send the associated data described above to various peripheral devices 19 when the determination unit 6 determines that a gas leak has occurred in the tire 101.

The tire inspection device 1D of the present embodiment may, together with the same additional tire inspection device 50 as that of the first embodiment (FIGS. 4 to 7), configure a tire inspection system.

Next, a tire inspection method using the tire inspection system of the present embodiment will be described.

In the tire inspection method of the present embodiment, the tire 101 is firstly inspected for a gas leak using the tire inspection device 1D.

Figure 12:
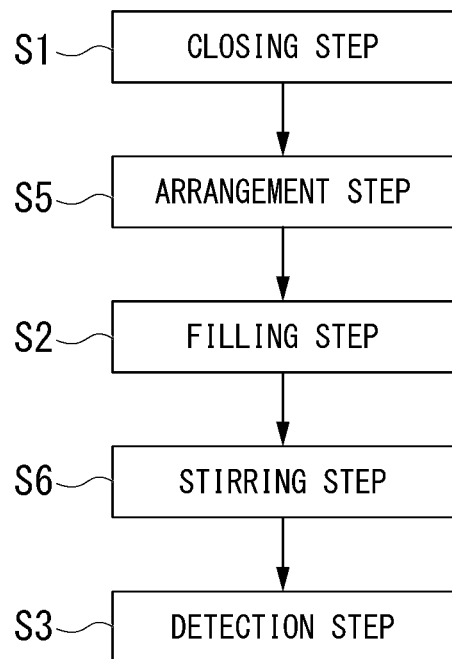
FIG. 12 is a flowchart showing an example of a tire inspection method according to the second embodiment of the present invention.

As shown in FIG. 12, the tire inspection method using the tire inspection device 1D includes, in the same manner as the tire inspection method of the first embodiment, a closing step S1, a filling step S2, and a detection step S3. Furthermore, the tire inspection method using the tire inspection device 1D also includes an arrangement step S5. Moreover, the tire inspection method using the tire inspection device 1D also includes a stirring step S6.

In the arrangement step S5, the tire 101 is disposed inside the housing unit 8D. In the arrangement step S5 of the present embodiment, the tire 101 is disposed on the base surface 21D, and then the tire 101 is covered with the hood 22D. FIG. 12 illustrates an example in which the arrangement step S5 is performed between the closing step S1 and the filling step S2. However, the tire inspection method is not limited to such an example. The arrangement step S5 may be performed at least after the closing step S1, and before the detection step S3.

In the stirring step S6, the air inside the housing unit 8D is stirred. The stirring step S6 of the present embodiment is performed by the fan 25D (stirring unit 9D). The stirring step S6 is performed at least at the time the detection step S3 is performed. That is to say, as illustrated in FIG. 12, the stirring step S6 may be started before the detection step S3 is performed, or may be started, for example, simultaneously with the detection step S3.

In the tire inspection method using the tire inspection device 1D of the present embodiment, the air inside the housing unit 8D is stirred by the fan 25D, which serves as the stirring unit 9D, in a state where the tire 101 is disposed inside the housing unit 8D. For this reason, if a gas is leaking out from the tire 101, the gas leaking out from the tire 101 can be efficiently dispersed inside the housing unit 8D. That is to say, the concentration of the gas that has leaked out from the tire 101 can be made uniform. As a result, a gas that has leaked out from the tire 101 can be detected by the gas sensors 2D in a short time, even if the gas sensors 2D (in particular, the detection surfaces 13D) are positioned away from the outer surface of the tire 101. That is to say, it is possible to inspect the tire 101 for the presence of a gas leak in a short time.

Then, the additional tire inspection device 50 is used to inspect a partial area of the outer surface of the tire 101 for the presence of a gas leak. The gas leak inspection by the additional tire inspection device 50 may be performed only with respect to a tire 101 that is determined to have a gas leak by the tire inspection device 1D described above. The gas leak position in the tire 101 can be specified by performing the gas leak inspection using the additional tire inspection device 50.

In the present embodiment, when a gas leak in the tire 101 is detected using the additional tire inspection device 50, the gas leak position (gas leak area) in the circumferential direction of the tire 101 is specified using the first additional inspection device 50A. At this time, the presence of a gas leak in the area of the outer surface of the tire 101 covered by the second gas sensor 51A may be inspected while changing the position of the second gas sensor 51A of the first additional inspection device 50A in the circumferential direction of the tire 101.

Then, the gas leak position in the arrangement direction of the one side surface 103, the ground contact surface 102, and the other side surface 104 of the tire 101 is more precisely specified using the second additional inspection device 50B. At this time, the presence of a gas leak in the area of the outer surface of the tire 101 covered by the second gas sensor 51A may be inspected while changing the position of the second gas sensor 51B of the second additional inspection device 50B inside the area of the outer surface of the tire 101, where the gas leak was detected by the first additional inspection device 50A.

As described above, according to the tire inspection device 1D and the tire inspection method of the present embodiment, the same effects as those of the first embodiment can be obtained.

Furthermore, according to the tire inspection device 1 and the tire inspection method of the present embodiment, the tire 101 is housed in the housing unit 8D. For this reason, even if the distance from the outer surface of the tire 101 to the detection surfaces 13D of the gas sensors 2D is long, it is possible to efficiently detect with certainty a gas that leaks out from the tire 101 using the gas sensors 2D, without being affected by the atmosphere (for example, wind) around the tire 101.

Furthermore, in the tire inspection device 1D and the tire inspection method of the present embodiment, by stirring the air inside the housing unit 8D that houses the tire 101, it is possible to detect a gas that has leaked out from the tire 101 in a short time using the gas sensors 2D. Moreover, it is possible to detect a gas that has leaked out from the tire 101 using the gas sensors 2D without reducing the pressure of the space inside the housing unit 8D. Therefore, in addition to being able to perform a gas leak inspection of the tire 101 in a short time, size reduction and cost reduction of the tire inspection device 1D can be achieved.

Furthermore, in the tire inspection device 1D of the present embodiment, the stirring unit 9D that stirs the air inside the housing unit 8D is configured by the fan 25D. For this reason, the position and orientation of the fan 25D inside the housing unit 8D can be freely set, and the direction of the air flow generated inside the housing unit 8D by the fan 25D can be arbitrarily set. As a result, for example, by disposing the fan 25D on the upstream side of the gas sensors 2D in the direction of the air flow, the gas that has leaked out from the tire 101 can be actively directed from the fan 25D toward the gas sensors 2D. Therefore, a gas leak inspection of the tire 101 can be performed in an even shorter time.

Furthermore, in the tire inspection device 1D of the present embodiment, the plurality of gas sensors 2D are arranged spaced apart in the direction of the air flow generated by the fan 25D. For this reason, it is possible to recognize the gas leak position in the tire 101 by using an offset in the timing (time difference) at which the plurality of gas sensors 2D detect the gas that has leaked out from the tire 101. For example, a gas sensor 2D positioned on the upstream side in the direction of the air flow detects the gas at an earlier timing than a gas sensor 2D positioned on the downstream side. As a result, it is possible to recognize that the gas leak position in the tire 101 is located closer to the gas sensor 2D positioned on the upstream side than the gas sensor 2D positioned on the downstream side. In the tire inspection device 1D of the present embodiment, a plurality of gas sensors 2D are arranged in the circumferential direction of the tire 101. For this reason, it becomes possible to recognize the gas leak position in the circumferential direction of the tire 101.

Furthermore, in the tire inspection device 1D of the present embodiment, the housing unit 8D is configured by the hood 22D, which is disposed on the base surface 21D and covers the tire 101 from above. By simply lifting up the hood 22D from the base surface 21D, the tire 101 can be easily moved in and out of the housing unit 8D.

Moreover, in the tire inspection device 1D of the present embodiment, the gas sensors 2D are installed on the hood 22D. For this reason, by simply disposing the hood 22D on the base surface 21D, the gas sensors 2D can be arranged in appropriate positions that enable a gas that has leaked out from the tire 101 to be detected.

As a result of the above, a gas leak inspection of the tire 101 can be easily performed.

Third Embodiment

Next, a third embodiment of the present invention will be described with reference to FIGS. 10 and 15. In the third embodiment, the same components as those in the first and second embodiments are denoted by the same reference symbols, and description thereof is omitted.

Figure 10:
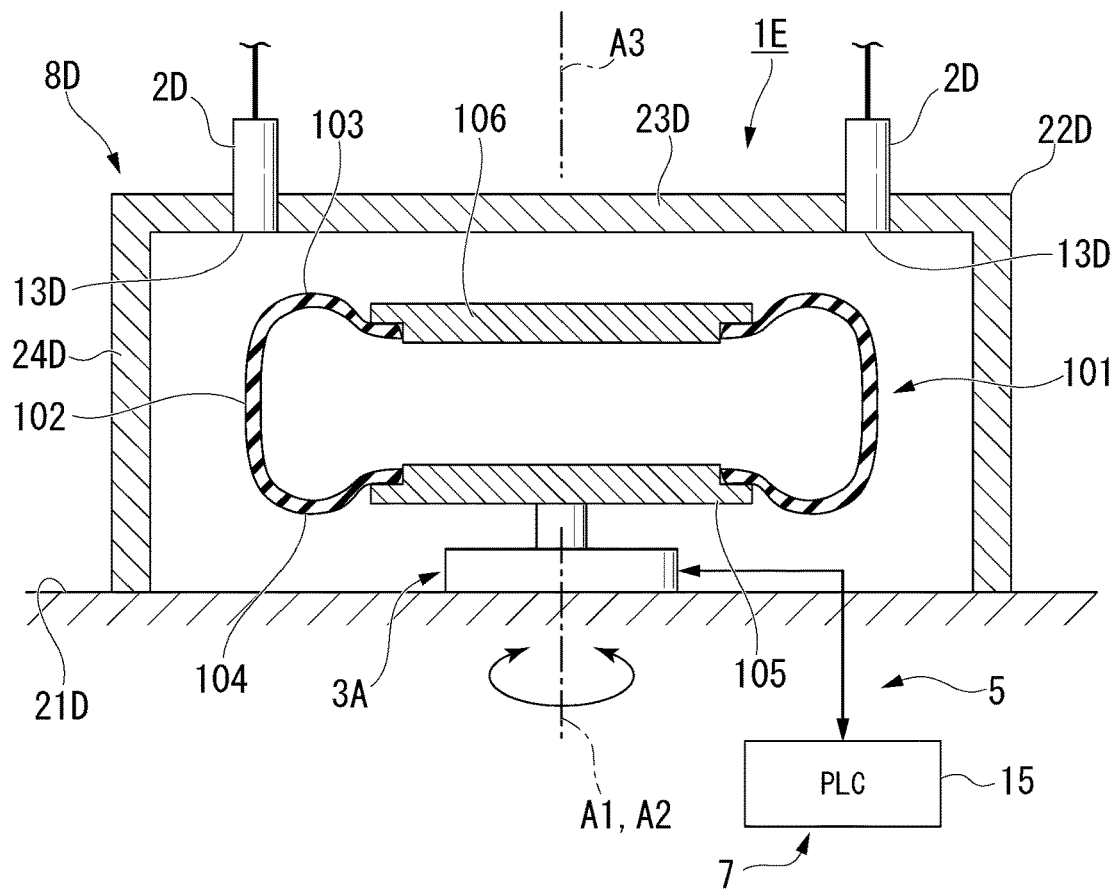
FIG. 10 is a cross-sectional view showing main parts of a tire inspection device according to a third embodiment of the present invention.
Figure 15:
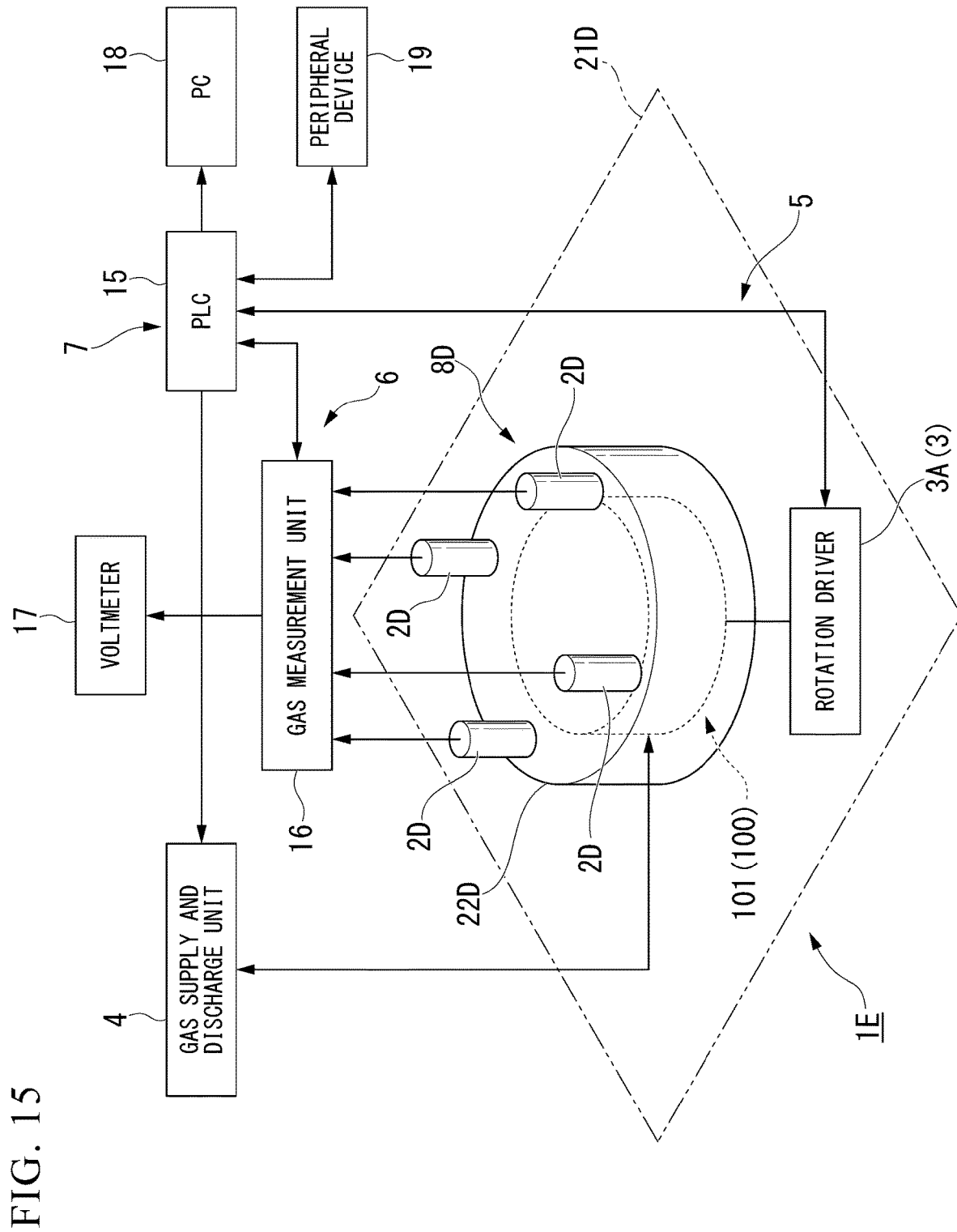
FIG. 15 is a diagram showing a configuration of a tire inspection device according to the third embodiment of the present invention.

As shown in FIGS. 10 and 15, a tire inspection device 1E of the present embodiment includes gas sensors 2D and a housing unit 8D in the same manner as the tire inspection device 1D of the second embodiment. The configuration and arrangement of the housing unit 8D and the gas sensors 2D, and the arrangement of the tire 101 inside the housing unit 8D are the same as in the second embodiment. Although not shown in the figure, the tire inspection device 1E of the present embodiment may include the same gas supply and discharge unit 4 and determination unit 6 as the second embodiment (see FIG. 8). Furthermore, the tire inspection device 1E of the present embodiment may include the same PLC 15, gas measurement unit 16, voltmeter 17, and PC 18 as those provided in the tire inspection device 1 of the first embodiment.

Moreover, the tire inspection device 1E includes the same rotation driver 3A as that provided in the tire inspection device 1 of the first embodiment. The rotation driver 3A rotates the tire 101 about its axis A1 as in the first embodiment. The gas sensors 2D are disposed facing the outer surface (the one side surface 103) of the tire 101 as in the second embodiment. For this reason, in the same manner as in the first embodiment, the rotation driver 3A of the present embodiment configures a movement unit that relatively moves the tire 101 and the gas sensors 2D about the axis A1 of the tire 101, such that the gas sensors 2D move along the outer surface (the one side surface 103) of the tire 101 in the circumferential direction of the tire 101.

Although the rotation driver 3A may, for example, be disposed outside the housing unit 8D, in the present embodiment it is housed inside the housing unit 8D together with the tire 101.

The rotation driver 3A is connected to the PLC 15 as in the first embodiment. That is to say, the rotation driver 3A and the PLC 15 configure a position detection unit 5, which is identical to that provided in the tire inspection device 1 of the first embodiment.

Furthermore, the PLC 15 also configures a leak position specification unit 7 which is identical to that provided in the tire inspection device 1 of the first embodiment. In the tire inspection device 1E of the present embodiment, the rotation driver 3A rotates the tire 101 disposed inside the housing unit 8D. As a result, it is also possible to stir the air inside the housing unit 8D by flowing the air in the rotation direction of the tire 101. That is to say, in the same manner as the fan 25D of the second embodiment, the rotation driver 3A of the present embodiment is capable of also functioning as a stirring unit that generates an air flow in the circumferential direction of the hood 22D and the tire 101.

The tire inspection device 1E of the present embodiment, together with the same additional tire inspection device 50 as that of the first embodiment (FIGS. 4 to 6), may configure a tire inspection system.

Furthermore, the tire inspection device 1E of the present embodiment is capable of performing the same tire inspection method as in the first and second embodiments.

As described above, according to the tire inspection device 1E of the present embodiment, the same effects as those of the first and second embodiments can be obtained.

Although several embodiments of the present invention have been described in detail above, the present invention is not limited to the embodiments above, and various changes may be applied within a scope not departing from the scope of the present invention.

In the tire inspection device 1E of the third embodiment, the stirring unit 9D may include, for example, the fan 25D of the second embodiment in addition to the rotation driver 3A.

The tire inspection devices 1D and 1E of the second and third embodiments may, for example, include a vacuum pump that reduces the pressure inside the housing unit 8D. The time required for performing a gas leak inspection of an inspection target such as a tire can be shortened by even slightly reducing the pressure inside the housing unit 8D using an inexpensive vacuum pump.

The tire inspection devices 1D and 1E of the second and third embodiments enable a gas leak inspection to be performed in a short time by stirring the inside of the housing unit 8D using the stirring unit (the fan 25D, the rotation driver 3A, or the like). However, the embodiments of the present invention are not limited to such a case. If it is necessary to specify the gas leak position, for example, the stirring unit does not have to be used. That is to say, the tire inspection devices according to the embodiments of the present invention may, for example, include only the housing unit and the gas sensors.

In this case, the gas leak position in the tire is specified using the plurality of gas sensors provided in the housing unit based on the gas detection amount (for example, the gas concentration) detected by each gas sensor, and the timing at which the gas is detected by each gas sensor. The greater the number of gas sensors, the more accurately the gas leak position can be specified. For example, by providing gas sensors to an extent that the whole tire is substantially covered, it is possible to specify the gas leak position in a shorter time.

Figure 14:
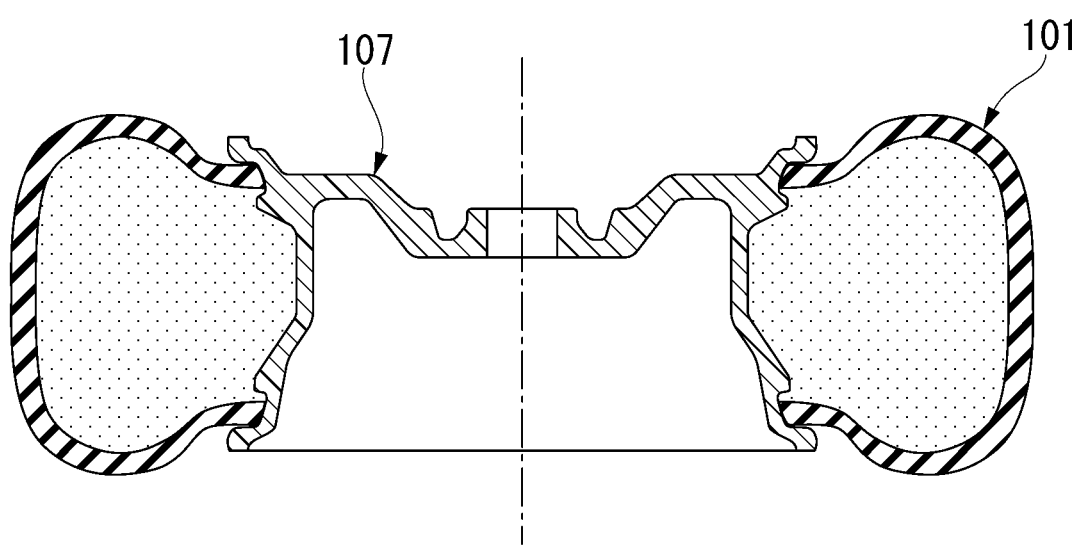
FIG. 14 is a cross-sectional view showing a wheeled tire.

In the embodiments of the present invention, when inspecting the tire for a gas leak, for example, the openings of the tire may be closed by assembling a wheel that supports the tire instead of using lid portions. That is to say, the closing step in the tire inspection method of the embodiments of the present invention may be performed by installing a wheel on the tire. If a wheel is used, it is possible to perform a gas leak inspection in the same state as when the tire is used. For this reason, it is possible to not only detect a fault in the tire itself, but also a fault that occurs when assembling the tire and wheel, and a gas leak from a rim portion (a boundary section between the tire and the wheel), which occurs based on the compatibility between the tire and the wheel, can be detected. FIG. 14 shows an example in which a wheel 107 is assembled to the tire 101.

On the other hand, if lid portions as described in the embodiments above are used at the time of a gas leak inspection of a tire, it is not necessary to assemble the tire and the wheel, and therefore, a gas leak inspection of the tire can be easily performed.

Whether lid portions or a wheel are used at the time of a gas leak inspection of a tire may be determined according to the purpose of the gas leak inspection.

According to an embodiment of the present invention, because a gas that leaks out from a tire is detected by a gas sensor, a gas leak in a tire can be detected easily and with certainty in a short time.

The present invention may be applied to a tire inspection device and a tire inspection method.

What is claimed is:

1. A tire inspection device comprising:
a gas sensor disposed outside of a tire and facing an outer surface of the tire; and
an actuator that produces relative movement between the tire and the gas sensor while the gas sensor faces the outer surface of the tire,
wherein the gas sensor detects a gas that escapes the tire,
wherein the actuator produces relative movement between the tire and the gas sensor by rotating the tire about an axis of the tire, and
wherein the gas sensor comprises a plurality of gas sensors spaced apart in a circumferential direction of the tire and centered about the axis of the tire.

2. The tire inspection device according to claim 1, wherein the plurality of gas sensors are disposed spaced apart from the outer surface of the tire.

3. The tire inspection device according to claim 1, further comprising:
a housing unit that houses the tire,
wherein the gas sensor is disposed in the housing unit.

4. The tire inspection device according to claim 1, wherein the outer surface of the tire includes at least either a ground contact surface of the tire or a side surface of the tire.

5. The tire inspection device according to claim 1, wherein the gas sensor comprises a detector that detects the gas, and an extension portion having an opening, the opening having a larger area than the detector.

6. A tire inspection system comprising:
a tire inspection device according to claim 1; and
an additional tire inspection device including an additional gas sensor and that covers a partial area of the outer surface of the tire and inspects the partial area for presence of a gas leak.

7. A tire inspection method using a tire inspection device including a gas sensor configured to be disposed outside of a tire, to face an outer surface of the tire, and to detect a gas escaping the tire and an additional tire inspection device including an additional gas sensor and being configured to cover a partial area of the outer surface of the tire and to inspect the partial area for presence of a gas leak, the method comprising:
  inspecting the tire for a gas leak using the tire inspection device; and
  inspecting the partial area for presence of the gas leak using the additional tire inspection device after the tire is inspected for the gas leak using the tire inspection device.

8. A tire inspection device comprising: a plurality of spaced apart gas sensors disposed circumferentially outside of a tire and facing an outer surface of the tire; a housing unit that houses the tire; and a stirrer that stirs air inside the housing unit generating an air flow in a direction toward the plurality of gas sensors, wherein the plurality of gas sensors are disposed in the housing unit and detect a gas that has leaked out from inside the tire housed in the housing unit, and wherein the stirrer includes a fan disposed inside the housing unit.

9. The tire inspection device according to claim 8, wherein the stirrer comprises a rotation driver that rotates the tire disposed inside the housing unit.

10. A tire inspection method comprising: closing an opening of a tire; disposing the tire inside a housing unit, introducing a gas into the tire; and detecting the gas that escapes the tire, in an atmosphere outside the tire, wherein detecting the gas comprises detecting a reactive gas with at least one of a plurality of gas sensors disposed circumferentially outside of the tire in the housing unit, in the atmosphere outside the tire, wherein the gas comprises a reactive gas that reacts with at least one of the plurality of gas sensors.

11. The tire inspection method according to claim 10, wherein the closing the opening of the tire comprises closing the opening of the tire with a lid portion.

12. The tire inspection method according to claim 10, wherein the opening of the tire is closed by the tire being installed on a wheel.

13. The tire inspection method according to claim 10, further comprising:
  causing relative movement between the tire and the gas sensor while causing the gas sensor to face an outer surface of the tire.

* * * * *